(12) United States Patent
Kang et al.

(10) Patent No.: US 11,499,893 B2
(45) Date of Patent: Nov. 15, 2022

(54) METHOD AND DEVICE FOR TRANSFERRING NANOPARTICLE MONOLAYER BY USING CAPILLARY TUBE

(71) Applicant: SOGANG UNIVERSITY RESEARCH FOUNDATION, Mapo-Gu (KR)

(72) Inventors: Taewook Kang, Mapo-Gu (KR); Jeehan Chang, Mapo-Gu (KR); Jaekyeong Lee, Seocho-gu (KR)

(73) Assignee: SOGANG UNIVERSITY RESEARCH FOUNDATION, Mapo-Gu (KR)

( * ) Notice: Subject to any disclaimer, the term of this patent is extended or adjusted under 35 U.S.C. 154(b) by 464 days.

(21) Appl. No.: 16/757,369

(22) PCT Filed: Oct. 19, 2018

(86) PCT No.: PCT/KR2018/012422
§ 371 (c)(1),
(2) Date: Jun. 26, 2020

(87) PCT Pub. No.: WO2019/078676
PCT Pub. Date: Apr. 25, 2019

(65) Prior Publication Data
US 2020/0333217 A1    Oct. 22, 2020

(30) Foreign Application Priority Data

Oct. 20, 2017  (KR) .................. 10-2017-0136396
Oct. 1, 2018   (KR) .................. 10-2018-0116757

(51) Int. Cl.
*G01J 3/44*     (2006.01)
*G01N 1/14*    (2006.01)
(Continued)

(52) U.S. Cl.
CPC ............. *G01N 1/14* (2013.01); *G01N 21/65* (2013.01); *B82B 3/0038* (2013.01); *G01N 2001/149* (2013.01)

(58) Field of Classification Search
CPC .... G01N 1/14; G01N 21/65; G01N 2001/149; G01N 21/658; B82B 3/0038; B82B 3/0076; B05D 1/185; B05D 7/24; B82Y 40/00
(Continued)

(56) References Cited

U.S. PATENT DOCUMENTS

2016/0189920 A1*  6/2016  Narum ................. C25D 5/026
                                              250/441.11

FOREIGN PATENT DOCUMENTS

JP     2014-128871 A    7/2014
KR     100597280 B1     7/2006
(Continued)

OTHER PUBLICATIONS

Lu, Yu et al.; "High-Density Silver Nanoparticle Film with Temperature-Controllable Interparticle Spacing for a Tunable Surface Enhanced Raman Scattering Substrate"; Nano Letters; vol. 5, No. 1; 2005; pp. 5-9.
(Continued)

*Primary Examiner* — Md M Rahman
(74) *Attorney, Agent, or Firm* — Winstead PC

(57) ABSTRACT

Disclosed are a method and a device for transferring a nanoparticle monolayer by using a capillary tube, wherein a nanoparticle monolayer present in a liquid-gas interface is locally and selectively separated and then transferred to a
(Continued)

substrate by using a capillary tube. Accordingly, nondestructive and reproducible transfer can be made regardless of the surficial properties and structures of the substrate to which the monolayer is to be transferred. Therefore, the method and the device enable an in-situ high-speed inspection of harmful materials, such as an illegal drug and a residual pesticide, on surfaces of various solids such as fiber clothes, food and banknotes, and can be easily coupled to a microfluid channel having a small size and a complicated structure. Further, the method and the device can transfer a nanoparticle monolayer in a simple and inexpensive process without using special and expensive equipment.

20 Claims, 44 Drawing Sheets

(51) Int. Cl.
  *G01N 21/65* (2006.01)
  *B82B 3/00* (2006.01)
(58) Field of Classification Search
  USPC .......................................................... 356/301
  See application file for complete search history.

(56) References Cited

FOREIGN PATENT DOCUMENTS

| KR | 100768632 B1 | 10/2007 |
| KR | 10-2016-0112282 A | 9/2016 |
| KR | 10-2016-0147005 A | 12/2016 |
| KR | 10-2017-0000726 A | 1/2017 |

OTHER PUBLICATIONS

Jackman, Rebecca J. et al.; "Fabrication of Submicrometer Features on Curved Substrates by Microcontact Printing"; Science; vol. 269; Aug. 4, 1995; pp. 664-666.
Osberg, Kyle D. et al.; "Dispersible Surface-Enhanced Raman Scattering Nanosheets"; Advanced Materials; vol. 24; 2012; pp. 6065-6070.
Li, Jian Feng et al.; "Shell-isolated nanoparticle-enhanced Raman spectroscopy"; Nature; vol. 464; Mar. 18, 2010; pp. 392-395.
Zhang, Li et al.; "Highly effective and uniform SERS substrates fabricated by etching multi-layered gold nanoparticle arrays"; Nanoscale; vol. 8; 2016; pp. 5928-5937.
Corbierre, Muriel K. et al.; "Gold Nanoparticles Generated by Electron Beam Lithography of Gold(I)-Thiolate Thin Films"; Chemistry of Materials; vol. 17 No. 23; 2005; pp. 5774-5779.

* cited by examiner

Scale bar : 5 mm

Scale bar : 5 mm

Scale bar (inset) : 50 nm

Scale bar (inset) : 50 nm

Scale bar (inset) : 50 nm

Scale bar (inset) : 50 nm

Scale bar (inset) : 50 nm

Scale bar (inset) : 50 nm

METHOD AND DEVICE FOR TRANSFERRING NANOPARTICLE MONOLAYER BY USING CAPILLARY TUBE

TECHNICAL FIELD

The present disclosure relates to a method and a device for transferring a nanoparticle monolayer by using a capillary tube.

NATIONAL R&D PROJECTS SUPPORTING THE PRESENT INVENTION

1. Project ID: 1711070909

Ministry in charge: Ministry of Science and ICT
Research management agency: National Research Foundation of Korea
Research project name: Individual basic research (MSIT) (R&D)
Research title: Development and application of self-assembly-based next-generation plasmonic hybrid nanostructure using programming technique
Contribution rate: 34/100
Research institution: Sogang University
Research period: 2018 Apr. 1-2019 Feb. 28

2. Project ID: 1711073357

Ministry in charge: Ministry of Science and ICT
Research management agency: National Research Foundation of Korea
Research project name: Development of climate change mitigation technology (R&D)
Research title: Development of technology for real-time monitoring of asymmetrically dissolved C1 gas and metabolites using surface-enhanced Raman spectroscopy
Contribution rate: 33/100
Research institution: Sogang University
Research period: 2018 Apr. 1-2018 Dec. 31

3. Project ID: 1345275622

Ministry in charge: Ministry of Education
Research management agency: National Research Foundation of Korea
Research project name: Project for establishment of basis for science and engineering researches
Research title: Institute of Integrated Biotechnology
Contribution rate: 33/100
Research institution: Sogang University
Research period: 2018 Jan. 1-2018 Dec. 31

BACKGROUND ART

A monolayer structure of nanoparticles formed through self-assembly at the water-organic solvent interface exhibits unique mechanical, optical and electrical properties distinguished from those of individual nanoparticles. For this reason, it draws a lot of attentions as a next-generation material capable of solving the problems of the existing technology in various fields such as high-efficiency electrodes, molecule detection, energy harvesting, etc.

Due to fluidic properties of liquids interface in the case, the nanoparticle monolayer present at the liquid-liquid interface is generally transferred onto a solid substrate for practical applications.

The method most frequently used for the transfer of the nanoparticle monolayer at the interface onto a solid substrate is Langmuir film deposition [Lu, Y., Liu, G. L. & Lee, L. P. High-density silver nanoparticle film with temperature-controllable interparticle spacing for a tunable surface enhanced Raman scattering substrate. Nano Lett. 5, 5-9 (2005)].

The Langmuir film deposition is achieved simply by contacting the substrate with the nanoparticle monolayer at the interface. If the contact orientation of the substrate is perpendicular to the interface, it is called Langmuir-Blodgett (LB) deposition, and if the contact orientation of the substrate is parallel to the interface, it is called Langmuir-Schaefer (LS) deposition.

The Langmuir film deposition is advantageous in that a large-area substrate can be prepared via a relatively simple process and the density of nanoparticles is also controllable. However, it is disadvantageous that the Langmuir film deposition is applicable only to a substrate having planar structure because the substrate should contact with the interface uniformly.

Accordingly, the conventional Langmuir film deposition has been applied limitedly only to planar substrates such as glass, silicon, etc., and is difficult to be applied to solid surfaces with various structures and surface properties that can be found around us.

In addition, the Langmuir film deposition is disadvantageous in that precise control of the transfer area and shape of the nanoparticle monolayer as well as the location of transfer is difficult.

To address these problems, the microcontact printing (μCP) technology of transferring a nanoparticle monolayer onto a polymer stamp prepared with desired shape and area and then stamping the same onto a solid substrate has been developed [Jackman, R. J., Wilbur, J. L. & Whitesides, G. M. Fabrication of submicrometer features on curved substrates by microcontact printing. Science 269, 664-666 (1995)].

Although the μCP technology partially solves the substrate dependence and poor maneuverability problems of the Langmuir film deposition method, there have been problems that the polymer stamp used as a medium may be deformed during the transfer, e.g., shrinkage, swelling, etc., and the nanoparticles may be lost if the attraction between the nanoparticle monolayer and the polymer stamp is larger than the attraction between the nanoparticle monolayer and the substrate.

In addition, the μCP technology is difficult to be applied to a substrate made of a soft material, particularly a biological surface, having possibility of potential damage during the transfer because sufficient pressure has to be applied during the transfer onto a substrate using a polymer stamp.

Meanwhile, the nanoparticle structure deposited onto a solid substrate by using the technologies described above can be applied to various fields including electronic devices, catalysts, energy harvesting, etc. Among them, the fields of microfluidic systems and optical molecular detection such as inspection of food surface, inspection of illegal substance such as drugs, detection of counterfeit banknotes, etc. are expected to be highly promising in particular.

Although optical molecular detection by introducing nanoparticles to microfluidic channels or the surface of food or banknotes has been attempted [Osberg, K. D., Rycenga, M., Bourret, G. R., Brown, K. A., & Mirkin, C. A. Dispersible Surface-Enhanced Raman Scattering Nanosheets. Adv. Mater. 24, 6065-6070 (2012): Li, J. F. et al. Shell-isolated nanoparticle-enhanced Raman spectroscopy. Nature 464, 392 (2010)], these technologies merely involve evaporation of the solvent of a nanoparticle solution on solid surface or immersion of solid in a nanoparticle solution for a span of time.

Because these technologies rely on random attachment of nanoparticles, the reproducibility of deposition gets very low and the sensitivity of detection is also low since nanoparticle structures controlled with high density cannot be formed.

DISCLOSURE

Technical Problem

In an aspect, exemplary embodiments of the present disclosure are directed to providing a method and a device for transferring a nanoparticle monolayer by using a capillary tube, wherein a uniform nanoparticle monolayer can be transferred with high reproducibility regardless of structure and surface energy of a substrate.

In another aspect, exemplary embodiments of the present disclosure are directed to providing a method and a device for transferring a nanoparticle monolayer by using a capillary tube, wherein area and nanoparticles of a transferred nanoparticle monolayer can be controlled.

In another aspect, exemplary embodiments of the present disclosure are directed to providing a method and a device for transferring a nanoparticle monolayer by using a capillary tube, which enable the fabrication of a microfluidic device coupled with an optical molecular detection system by introducing a nanoparticle monolayer into a microfluidic channel with a small diameter.

In another aspect, exemplary embodiments of the present disclosure are directed to providing a method and a device capable of detecting harmful materials such as agrochemicals, illegal substance such as drugs, etc., explosives, or the like in real time in situ on various solid surfaces such as variety of food, clothes, banknotes, etc. or on cell surface of organisms or microorganisms, etc.

Technical Solution

Exemplary embodiments of the present disclosure provide a method for transferring a nanoparticle monolayer, wherein a nanoparticle monolayer is separated and transferred to a substrate by using a capillary tube.

In an exemplary embodiment, the method for transferring a nanoparticle monolayer includes: a step of forming a nanoparticle monolayer at a liquid-gas interface; a step of separating the nanoparticle monolayer into a capillary tube by contacting the capillary tube with the liquid-gas interface; and a step of transferring the nanoparticle monolayer in the capillary tube to a substrate.

In addition, exemplary embodiments of the present disclosure provide a device for transferring a nanoparticle monolayer, which includes a capillary tube separating and then transferring a nanoparticle monolayer.

In an exemplary embodiment, the device includes: a nanoparticle monolayer-forming unit wherein a nanoparticle monolayer is formed at a liquid-gas interface; and the capillary tube provided to the monolayer-forming unit.

In addition, exemplary embodiments of the present disclosure provide a method for detecting a material to be detected, which includes: a step of separating and transferring a nanoparticle monolayer to a substrate on which a material to be detected is located by using a capillary tube; and a step of detecting the material to be detected on the substrate from a Raman signal of the transferred nanoparticle monolayer.

In addition, exemplary embodiments of the present disclosure provide a device for detecting a material to be detected, which includes: a capillary tube separating and then transferring a nanoparticle monolayer; and a detection unit irradiating a laser to the transferred nanoparticle monolayer and detecting the material to be detected from a Raman signal of the nanoparticle monolayer.

In an exemplary embodiment, the detection method and device may be for detection of a drug or an explosive on the surface of clothes or banknotes or for detection of harmful materials on food surface.

In addition, exemplary embodiments of the present disclosure provide a method for determining a counterfeit banknote, which includes: a step of separating a nanoparticle monolayer by using a capillary tube and transferring the nanoparticle monolayer in the capillary tube to at least one part of an authentic banknote, wherein a banknote is determined to be authentic if a Raman signal is detected from the transferred nanoparticle monolayer.

In addition, exemplary embodiments of the present disclosure provide a method for fabricating a microfluidic channel, which includes a step of separating and transferring a nanoparticle monolayer into a microfluidic channel by using a capillary tube.

Advantageous Effects

The exemplary embodiments of the present disclosure are applicable to nonplanar solid substrate of various structures because the effect of the curvature of a substrate is little since a capillary tube with a small diameter is used.

In addition, because the transfer of nanoparticles is induced through contact between the substrate surface and a liquid interface, without applying pressure during the transfer, nondestructive transfer is possible even to a fragile substrate made of a soft material.

In addition, since the nanoparticle monolayer at the liquid interface can be directly contacted with solid substrate, a uniform nanoparticle monolayer can be transferred with reproducibility and without loss of nanoparticles by van der Waals attraction, unlike the existing μCP technology.

In addition, since the nanoparticle monolayer at the liquid interface maintains high stability inside a capillary tube, which in turn allows a good operability of the capillary tube, the nanoparticle monolayer can be transferred to a desired location with higher accuracy as compared to the Langmuir film deposition method.

In addition, the nanoparticle monolayer may be used as a probe of an optical sensor. Since the diameter of laser-irradiated area is micrometer scale in general, the existing large-area transfer method exhibits low efficiency in number of nanoparticles per laser-irradiated area. In contrast, according to the exemplary embodiments of the present disclosure, the efficiency in number of nanoparticles per laser-irradiated area can be improved greatly because a nanoparticle monolayer may be transferred onto an area similar to the laser-irradiated area, e.g., an area with a diameter of 1 mm or smaller.

In addition, because the method and the device for transferring a nanoparticle monolayer by using a capillary tube according to the exemplary embodiments of the present disclosure require only a commercially available glass capillary tube, transfer can be achieved simply at low cost without requiring special equipment or high-level expertise.

In addition, according to the method and the device for transferring a nanoparticle monolayer by using a capillary tube of exemplary embodiments of the present disclosure, multiple nanoparticle monolayers can be transferred at the same time by using a bundle of multiple capillary tubes and the patterning of a complicated shape is also possible.

In addition, according to exemplary embodiments of the present disclosure, a nanoparticle monolayer can be easily introduced with reproducibility to solid surfaces having various structures and surface properties, such as fabrics, food, banknotes, etc., to which reproducible transfer is difficult with the existing method. Accordingly, the present disclosure can be widely used for various applications such as food safety test such as detection of residual agrochemicals as well as high-speed in-situ inspection of illegal drugs, explosives, etc., prevention of counterfeit banknotes, or the like.

MODE FOR THE INVENTION

Hereinafter, exemplary embodiments of the present disclosure are described in detail.

In the present disclosure, nano refers to a size of 1000 nm or less.

In the present disclosure, 2-dimensional means that, although the horizontal size and vertical size of a structure does not have at least one order of magnitude difference, the horizontal size and a thickness and the vertical size and the thickness have at least one order of magnitude difference (difference of at least 10 times). For example, a plate shape is a 2-dimensional shape.

In the present disclosure, a harmful material refers to various agrochemicals such as an organophosphate, organochlorine, mercury-based or carbamate-based pesticide etc. such as chlorpyrifos, chlorpyrifos-methyl, parathion, methylparathion, carbophenothion, fenitrothion, etc. detected from food, etc., or other materials known as harmful to the human body.

In the present disclosure, a drug includes an illegal drug such as philopon, cocaine, marijuana, etc. or other drugs the distribution, etc. of which is restricted or forbidden by law.

The present disclosure provides a technology of separating a nanoparticle monolayer present at a liquid-gas interface, more specifically, e.g., an interface between an aqueous solution and air, with a capillary tube in a narrow region by utilizing a capillary action where water surface rise in a thin tube due to surface tension and then transferring the separated nanoparticle monolayer to a substrate by inverting the capillary tube.

That is, exemplary embodiments of the present disclosure provide a method for separating and then transferring a nanoparticle monolayer by using a capillary tube.

Specifically, the method may include: a step of forming a nanoparticle monolayer at a liquid-gas interface; a step of selectively separating the nanoparticle monolayer by contacting the capillary tube with the liquid-gas interface and by locally and selectively containing the nanoparticle monolayer into a capillary tube; and a step of transferring the nanoparticle monolayer in the capillary tube to a substrate by inverting the capillary tube and contacting the capillary tube with the substrate.

Also, exemplary embodiments of the present disclosure provide a device for transferring a nanoparticle monolayer by using a capillary tube, which includes a capillary tube separating and then transferring a nanoparticle monolayer.

Specifically, the device may be a device for transferring a nanoparticle monolayer by using a capillary tube, which includes: a nanoparticle monolayer-forming unit wherein a nanoparticle monolayer is formed at a liquid-gas interface; and the capillary tube provided to the monolayer-forming unit.

Figure 1:
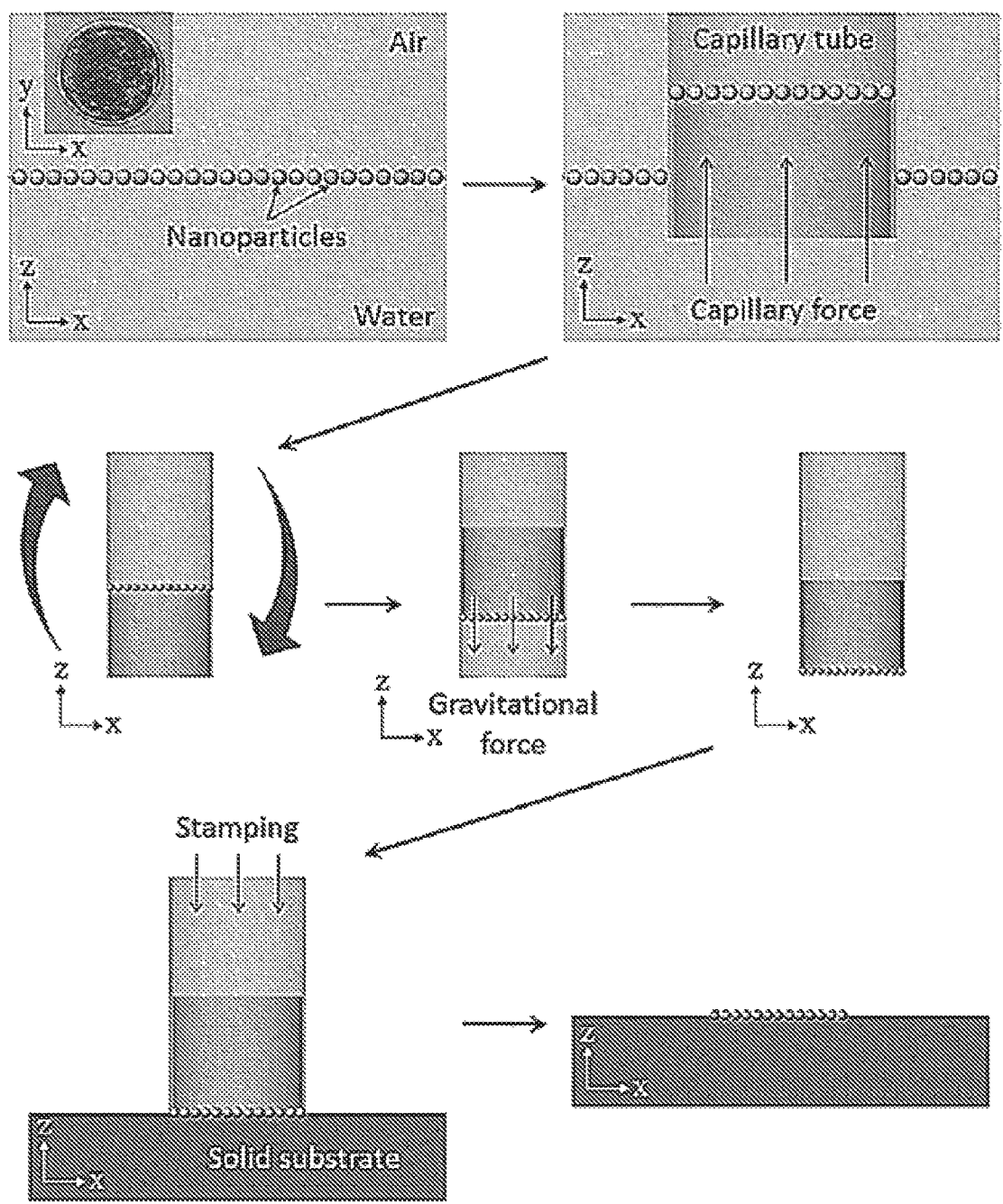
FIG. 1 schematically illustrates the transfer of a nanoparticle monolayer by using a capillary tube according to an exemplary embodiment of the present disclosure.

FIG. 1 schematically shows the transfer of a nanoparticle monolayer formed at an interface between nanoparticle aqueous solution and air through self-assembly to a solid substrate by using a capillary tube according to an exemplary embodiment of the present disclosure.

As shown in FIG. 1, firstly, nanoparticles dispersed in water may be self-assembled as a monolayer at an interface between water and air by controlling interparticle interaction using an organic solvent.

Explaining more in detail the formation of the nanoparticle monolayer at the interface through self-assembly, a liquid-gas interface may be formed by forming a liquid-liquid interface first and then evaporating the upper liquid, or a liquid-gas interface may be formed directly.

In case of a nanoparticle monolayer present at a liquid-liquid interface, the monolayer present at a liquid-air interface may be transferred after evaporating the liquid phase existing in the upper layer. For example, in the example as described below, a nanoparticle monolayer is formed first on an interface between water and hexane and then transferred to a substrate after evaporating hexane.

As for non-limiting examples, when the liquid phase is water, an organic solvent such as benzene, toluene, chloroform, hexane, a fatty acid such as oleic acid, an aliphatic amine such as oleylamine, etc. may be used to form an interface with water.

Meanwhile, an alcohol may be added to the liquid-liquid interface to induce the self-assembly of the nanoparticles.

When a liquid-gas interface is formed directly, an organic solvent such as benzene, toluene, hexane, chloroform, etc. may be used as the lower liquid phase.

The gas phase may be air.

Then, a capillary tube is contacted with the interface at which the nanoparticle monolayer is present and the nanoparticle monolayer is accommodated in the capillary tube together with the liquid through capillary action.

For example, a capillary tube with a cross-sectional diameter 2 mm or less, e.g., 0.1-2 mm, 0.1-1.5 mm or 0.1-1 mm, may be contacted vertically with a water-air interface where a nanoparticle monolayer is present.

At this time, the water level inside the capillary tube rises rapidly by the capillary force occurring due to the surface tension of water. The nanoparticle monolayer present in the capillary tube is elevated together with water while maintaining its structure at the interface.

Then, if the capillary tube is separated and then inverted such that the opening of the capillary tube which has been contacted with the water surface faces upward, the solution in the capillary tube descends in the opposite direction due to gravitational force, and the nanoparticle monolayer structure is exposed to the opening of the capillary tube.

Even in this state, the aqueous solution does not flow out of the capillary tube because its contact with the hydrophilic glass is stable.

If the nanoparticle monolayer exposed to the opening of the capillary tube is contacted vertically with a solid substrate surface desired to be transferred to and then is detached, only the nanoparticle monolayer remains on the solid substrate surface due to the van der Waals interaction between the nanoparticles and the solid substrate.

Accordingly, loss of the nanoparticles can be minimized because the direct contact of the nanoparticle monolayer with the solid substrate at the interface is induced through van der Waals attraction without using a secondary polymer stamp. Meanwhile, electrostatic attraction may also be utilized instead of the van der Waals attraction.

Since big size of cracking of the nanoparticle monolayer occurring during the transfer of the nanoparticle monolayer can be prevented by using the capillary tube, the nanoparticle monolayer which has been transferred by using the capillary tube becomes comparatively more uniform.

The nanoparticles at the interface cannot help existing irregularly to the extent that where the nanoparticles exist and where they do not exist is largely divided even in the naked eye. Therefore, if such nanoparticles are transferred with a large area, non-uniform transfer is unavoidable since the parts where the nanoparticles exist have to be transferred together with the parts where they do not exist. However, when the nanoparticles are transferred by using a capillary tube, they can be transferred more uniformly with higher reproducibility because a monolayer can be locally separated and transferred from the parts where the nanoparticles exist.

In an exemplary embodiment, the nanoparticle monolayer separated and transferred by the capillary tube may have a diameter of approximately 0.1-2 mm and an area of approximately 0.01-4 mm$^2$.

In an exemplary embodiment, the transferred nanoparticles may have a diameter of 5-200 nm.

In an exemplary embodiment, the nanoparticles are not particularly limited. For example, the transferred nanoparticle may be one or more selected from an inorganic material such as a metal, a metal oxide, etc., or an organic material. The metal may be Au, Ag, Pd, Pt, Al, Cu, Co, Cr, Mn, Ni, Fe, etc. The inorganic material may be silica, a quantum dot, a lanthanide, iron oxide, etc. The organic material may be polystyrene, polyethylene glycol, etc.

In an exemplary embodiment, the shape of the transferred nanoparticle is not particularly limited. For example, the transferred nanoparticle may have one or more shape selected from a group consisting of a sphere, a rod, an ellipsoid, a dendrimer, a tetrahedron, a hexahedron, an octahedron, a 2-dimensional quadrangle and a 2-dimensional triangle. In addition, the nanoparticle may have a core-shell structure.

In an exemplary embodiment, the substrate is not limited as long as it can accept the nanoparticle monolayer from the capillary tube. For example, it may be a hydrophilic or hydrophobic substrate, more specifically a hydrophilic or hydrophobic solid substrate.

As for non-limiting examples, the substrate may be one or more substrate selected from a polymer, glass, ITO, silicon, a metal, paper, a cell, etc. The polymer substrate may be one or more selected from PDMS, PMMA, a hydrogel, etc. The metal substrate may be one or more selected from Au, Ag, Pd, Pt, Al, Cu, Co, Cr, Mn, Ni, Fe, etc.

In another exemplary embodiment, the substrate may be a planar substrate, a substrate with coarse surface roughness, or a curved substrate with large curvature, and may include a fibrous substrate, a porous substrate, etc.

As for non-limiting examples, the substrate may be one or more of various food including rice, vegetable, fruit, meat, seafood, etc., clothing, paper such as a banknote, etc., a porous filter, a cell of a living body or a microorganism, etc. For example, the cell of a living body may be a skin cell of an animal or a plant. For example, the microorganism may be $E.\ coli$ etc. coated on a substrate. Likewise, the method and the device using the capillary tube of the present disclosure are very useful for such substrates that require nondestructive and precise manipulation.

In another exemplary embodiment, the substrate for the transfer may be a microfluidic channel.

In an exemplary embodiment, multiple nanoparticle monolayers with small area may be transferred at once to the same substrate by using multiple capillary tubes. In addition, patterning of complex shape is also possible by controlling the location of transfer.

In another exemplary embodiment, the shape or area of the transferred nanoparticles can be controlled by variously controlling the structure, shape or area of the capillary tube.

Meanwhile, exemplary embodiments of the present disclosure also provide a method for detecting a material to be detected, which includes: a step of separating and transferring a nanoparticle monolayer to a substrate by using a capillary tube; and a step of detecting the material to be detected on the substrate from a Raman signal of the transferred nanoparticle monolayer.

In an exemplary embodiment, the transferring step may include: a step of forming a nanoparticle monolayer at a liquid-gas interface; a step of separating the nanoparticle monolayer into the capillary tube by contacting the capillary tube with the liquid-gas interface; and a step of transferring the nanoparticle monolayer in the capillary tube to the substrate.

Exemplary embodiments of the present disclosure also provide a device for transferring a nanoparticle monolayer by using a capillary tube, which includes a capillary tube separating a nanoparticle monolayer and then transferring the same to a substrate.

Specifically, the device may include: a nanoparticle monolayer-forming unit where a nanoparticle monolayer is formed at a liquid-gas interface; and the capillary tube provided to the monolayer-forming unit.

In an exemplary embodiment, the method and the device can be usefully used to detect a drug or an explosive on clothing surface or banknote surface, or to detect a harmful material on food surface.

Exemplary embodiments of the present disclosure also provide a method for detecting a counterfeit banknote, which includes a step of separating a nanoparticle monolayer by using a capillary tube and transferring the nanoparticle monolayer in the capillary tube to at least one part of an authentic banknote, wherein a banknote is determined to be authentic if a Raman signal is detected from the transferred nanoparticle monolayer.

Exemplary embodiments of the present disclosure also provide a method for fabricating a microfluidic channel, which includes a step of separating and transferring a nanoparticle monolayer into a microfluidic channel by using a capillary tube.

According to the exemplary embodiments of the present disclosure as described above, capillary action is used to selectively separate a nanoparticle monolayer with a small area. Accordingly, a uniform nanoparticle monolayer can be transferred with reproducibility regardless of the surface properties and structures of solid substrates. In addition, transfer can be achieved with low cost and very high speed simply and with high accessibility by using a commercially available glass capillary tube without using special expertise and expensive equipment.

In addition, the method and the device of the present disclosure may be widely used for high-speed in-situ inspection of illegal drugs, explosives, harmful materials, etc. or technology for preventing counterfeit banknotes by transferring a nanoparticle monolayer to the surface of textile clothing, various food such as rice grains, orange, etc., or paper such as banknotes, etc.

Hereinafter, specific examples according to exemplary embodiments of the present disclosure will be described in more detail. However, the present disclosure is not limited to the following examples, and various types of examples may be embodied within the scope of the appended claims, and it will be understood that the following examples are merely intended to make the present disclosure complete and at the same time easy to the skilled in the art.

Comparative Example

Formation of Nanoparticle Monolayer Through Self-assembly of Nanoparticles 3 mL of n-hexane was cautiously added to 9 mL of a nanoparticle aqueous solution to form an interface. Then, after adding 4.5 mL of ethanol onto the nanoparticle aqueous solution, n-hexane was evaporated completely at room temperature for 6 hours.

The hexane was added to form an interface with the aqueous solution. Although metal nanoparticles remain stable at the interface due to the energy by the surface tension, self-assembly does not occur when only hexane is added because the electrostatic repulsion between the nanoparticles is stronger. Ethanol can induce self-assembly by reducing the electrostatic repulsion since ethanol weakens the charge of the molecules surrounding the nanoparticles.

Transfer of Nanoparticle Monolayer to Solid Substrate

A 1 cm×1 cm PDMS substrate was contacted horizontally with the interface at which the nanoparticle monolayer was present and then detached.

Figure 2:
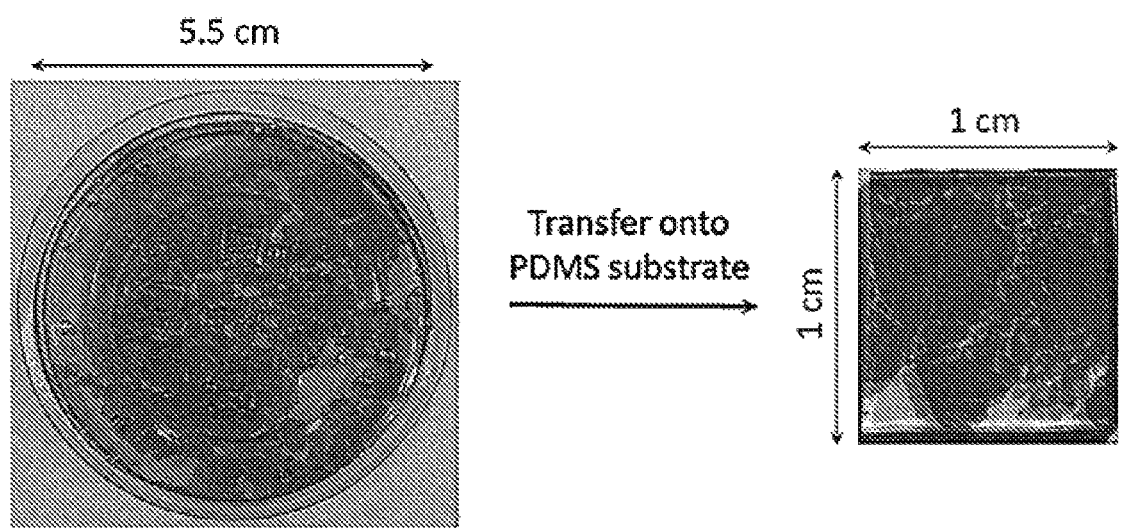
FIG. 2 shows a gold nanoparticle monolayer with a size of 50 nm, located at a liquid-gas interface, which has been transferred onto a 1 cm×1 cm PDMS substrate by using the existing method in a comparative example of the present disclosure.
Figure 3A:
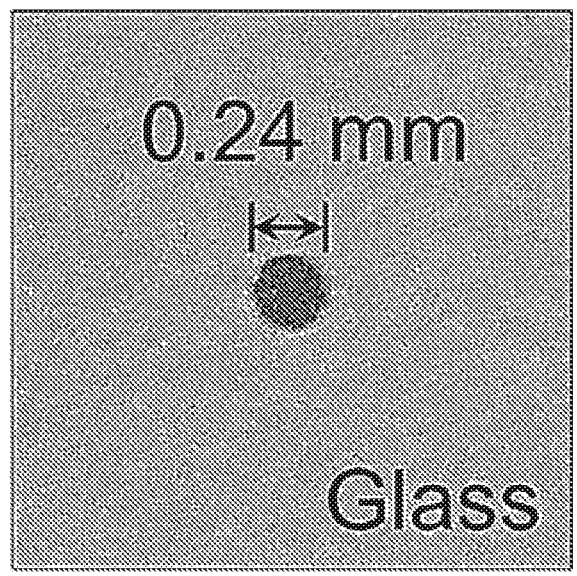
FIGS. 3A-3D show a gold nanoparticle monolayer with a size of 50 nm, which has been transferred onto PDMS substrates with various sizes by using a capillary tube in an example of the present disclosure.
Figure 3B:
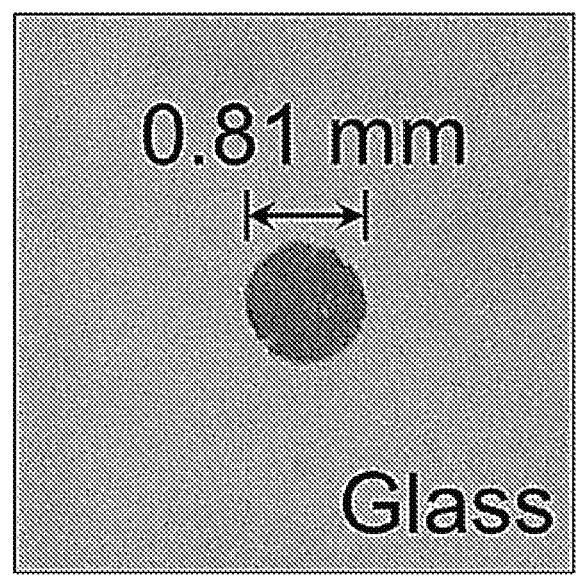
Figure 3C:
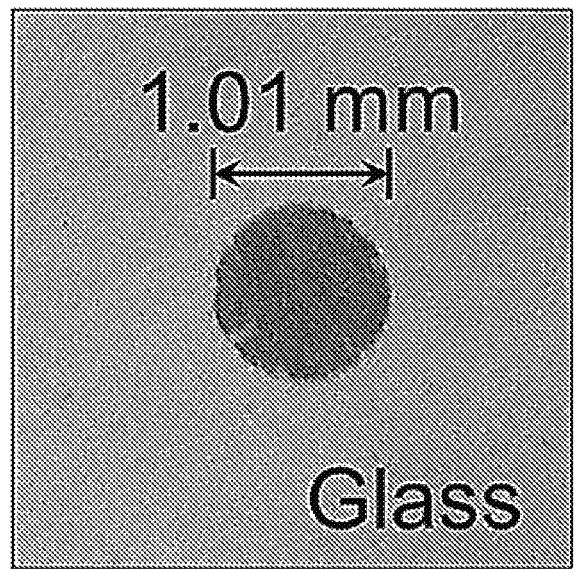
Figure 3D:
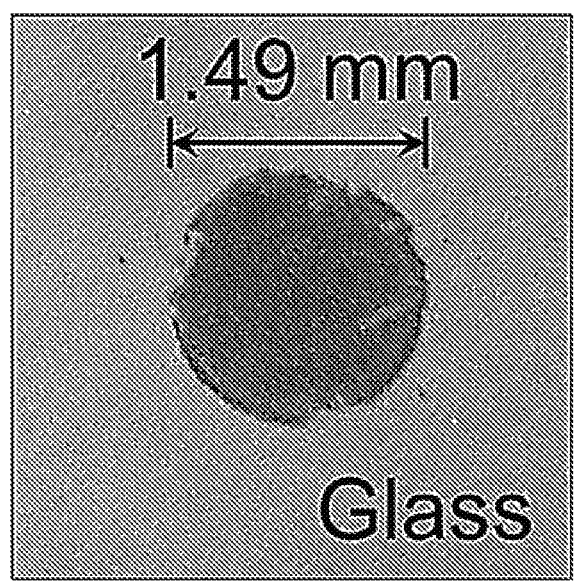

FIG. 2 shows a spherical gold nanoparticle monolayer with a size of 50 nm, present at a water-air interface, which was transferred onto a 1 cm×1 cm PDMS substrate, in Comparative Example of the present disclosure. The solid substrate having affinity for the nanoparticles was contacted horizontally and then detached.

Example

Formation of Nanoparticle Monolayer Through Self-assembly of Nanoparticles 3 mL of n-hexane was cautiously added to 9 mL of a nanoparticle aqueous solution to form an interface. Then, after adding 4.5 mL of ethanol onto the nanoparticle aqueous solution, n-hexane was evaporated completely at room temperature for 6 hours.

Selective Separation of Nanoparticle Monolayer By Using Capillary Tube

By vertically contacting a capillary tube with a length of 12.5 cm and a total volume of 10, 50, 100, 200 µL, respectively with the nanoparticle monolayer formed at the aqueous solution-air interface, the aqueous solution was allowed to rise inside the capillary tube to a certain level. Then, the capillary tube was pulled out.

Transfer of Separated Nanoparticle Monolayer to Solid Substrate

The pulled out capillary tube was inverted such that the solution inside the capillary tube descended down to the opposite opening by gravitational force. The capillary tube in this state was contacted vertically to the transferring parts of PDMS and glass substrates and then detached.

FIGS. 3A-3D show pictures of gold nanoparticle monolayers with a size of 50 nm which were transferred with various sizes to a PDMS substrate by the transferring technique using the capillary tube in Example of the present disclosure.

As seen from FIGS. 3A-3D, the transferred area varied depending on the diameter of the opening of the capillary tube. Unlike the monolayer of Comparative Example transferred without using a capillary tube, the monolayer was transferred relatively uniformly with less cracking.

Figure 4A:
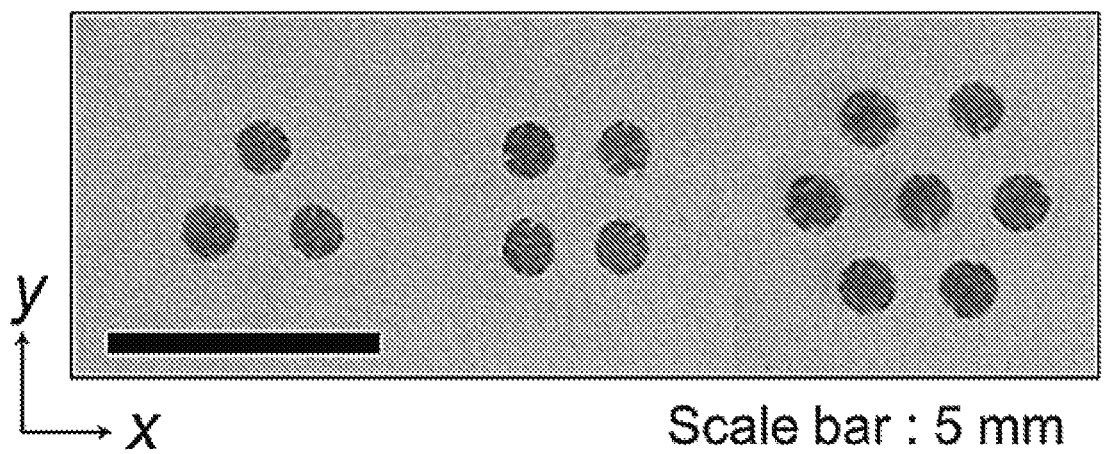
FIGS. 4A and 4B show a spherical gold nanoparticle monolayer with a size of 50 nm, which has been transferred at the same time (FIG. 4A), and has been patterned into the characters 'NRG' (FIG. 4B), by using a bundle of multiple capillary tubes in an example of the present disclosure.
Figure 4B:
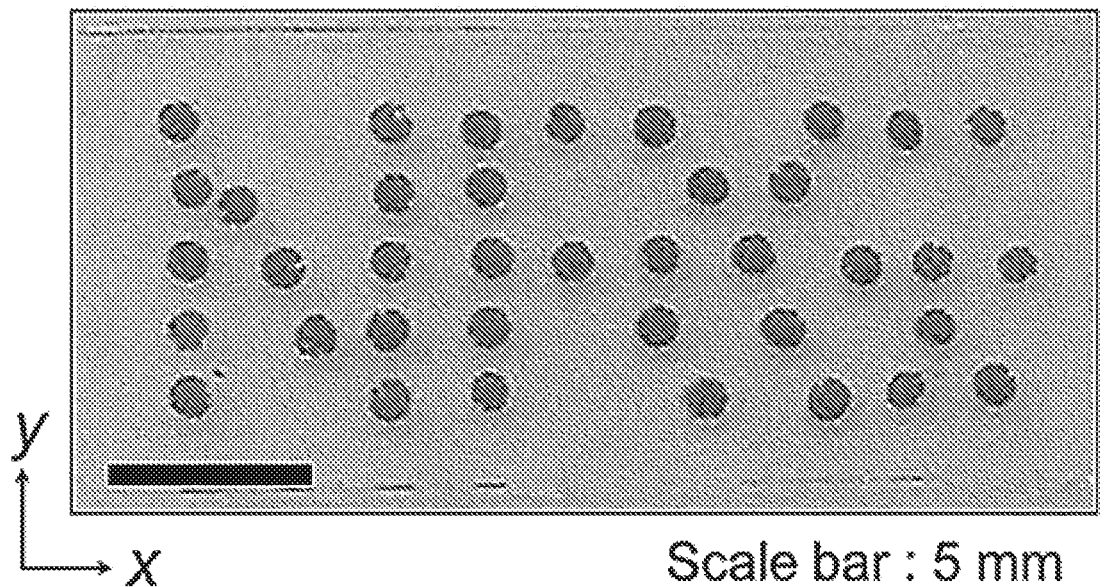
Figure 5A:
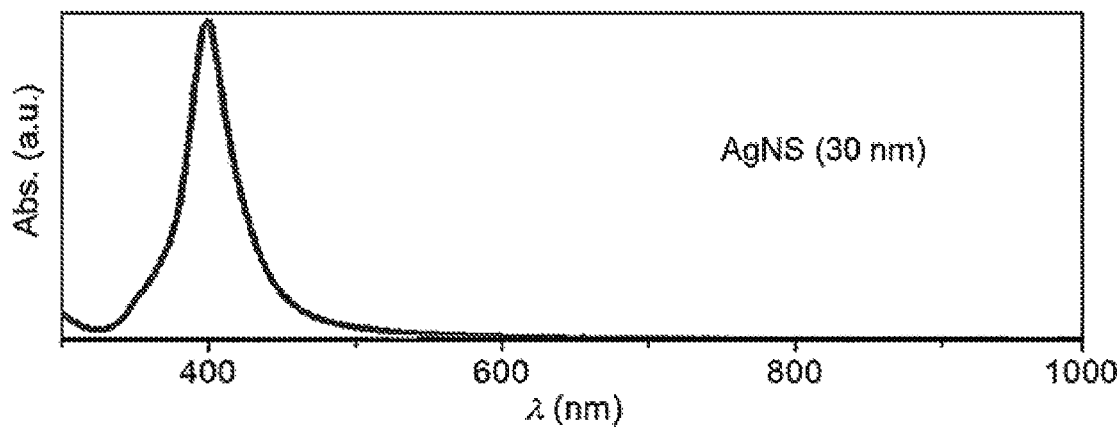
FIGS. 5A-5F show UV datum for six types of various nanoparticles in an example of the present disclosure.
Figure 5B:
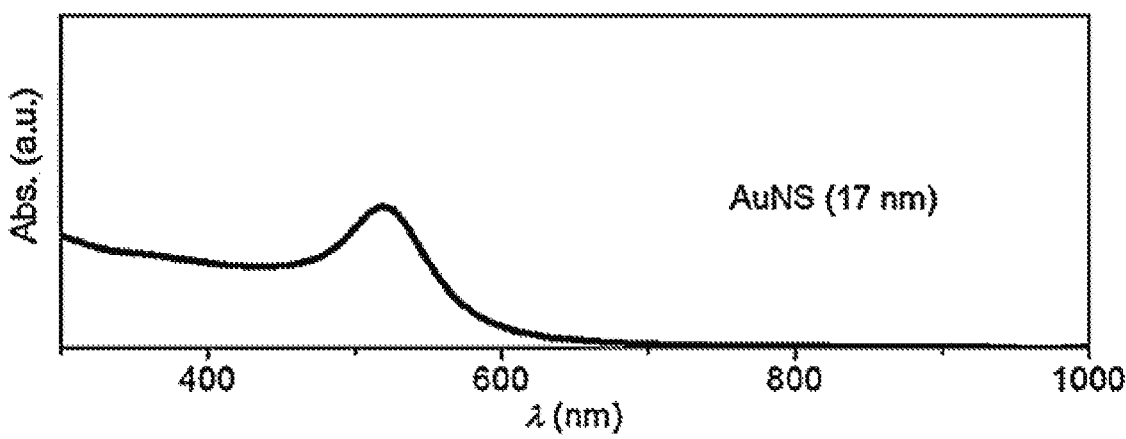
Figure 5C:
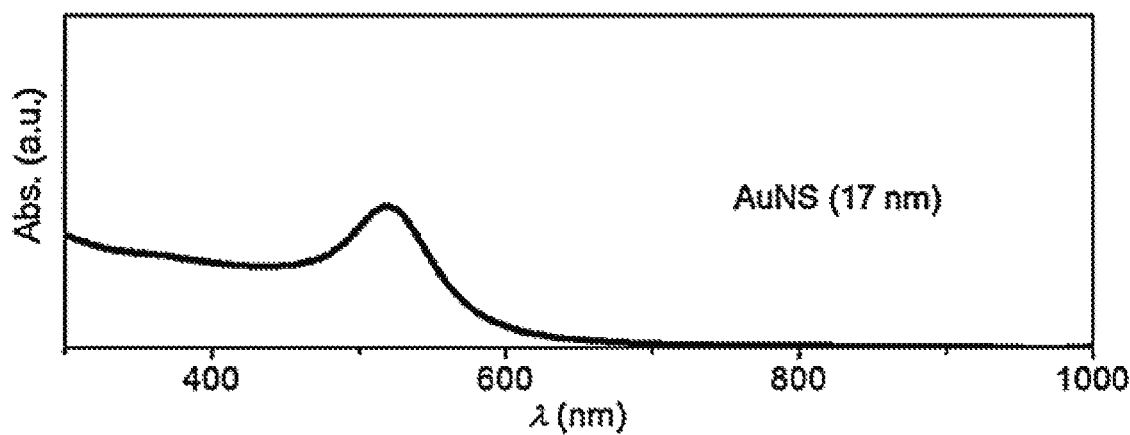
Figure 5D:
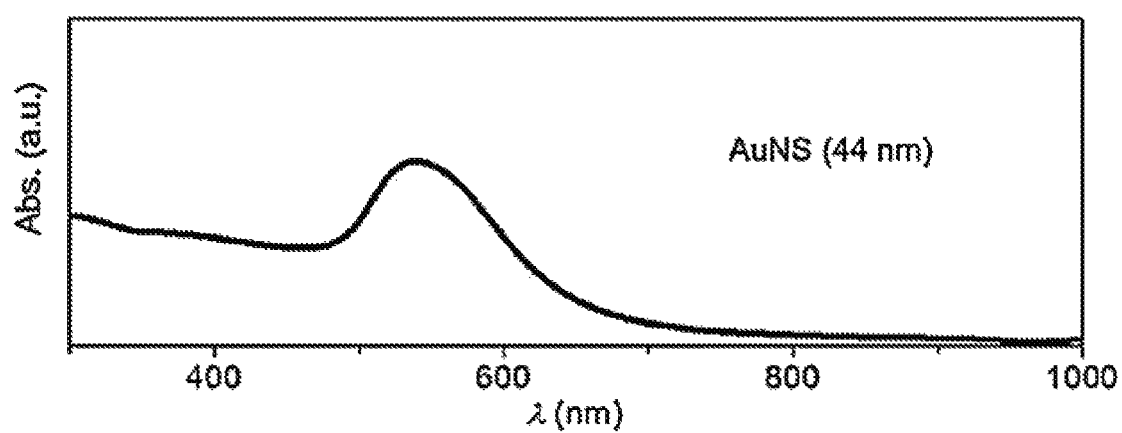
Figure 5E:
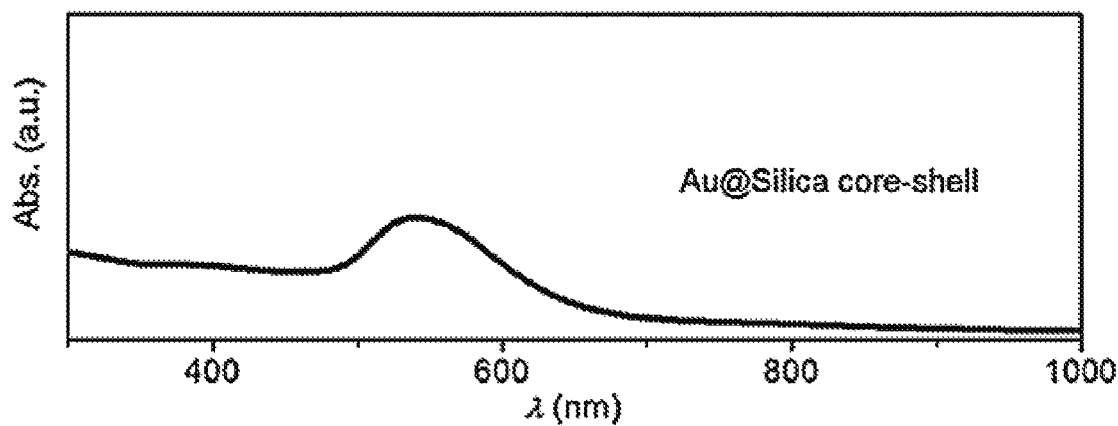
Figure 5F:
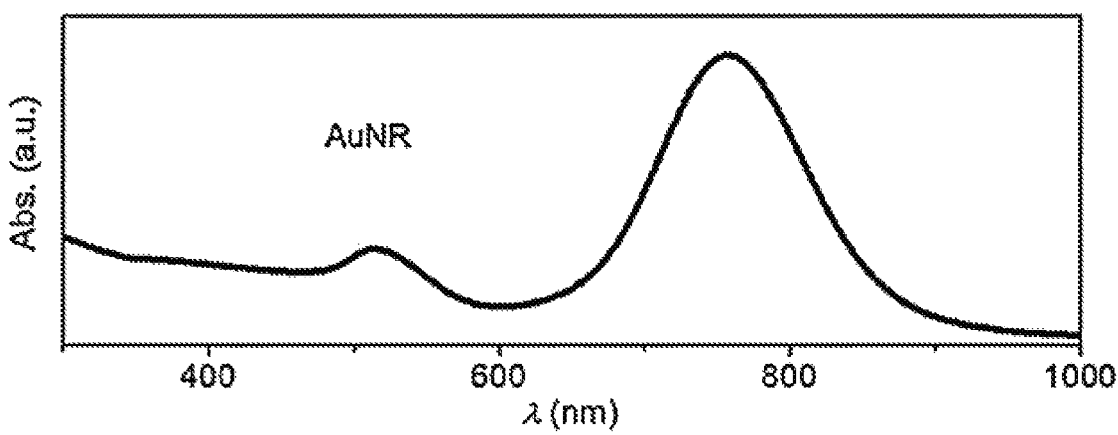

FIGS. 4A and 4B show multiple nanoparticle monolayers transferred at the same time using a bundle of multiple capillary tubes. As seen from FIGS. 4A and 4B, not only a simple pattern but also a complex pattern such as 'NRG' can be achieved since precise control of transfer location is possible by using the capillary tube.

FIGS. 5A-5F show UV data for six types of different nanoparticles, obtained in Example of the present disclosure.

FIGS. 6A-6F show a result of analyzing nanoparticle monolayers of various shapes and compositions that have been transferred to glass substrates by using a capillary tube with a scanning electron microscope in Example of the present disclosure.

Figure 6A:
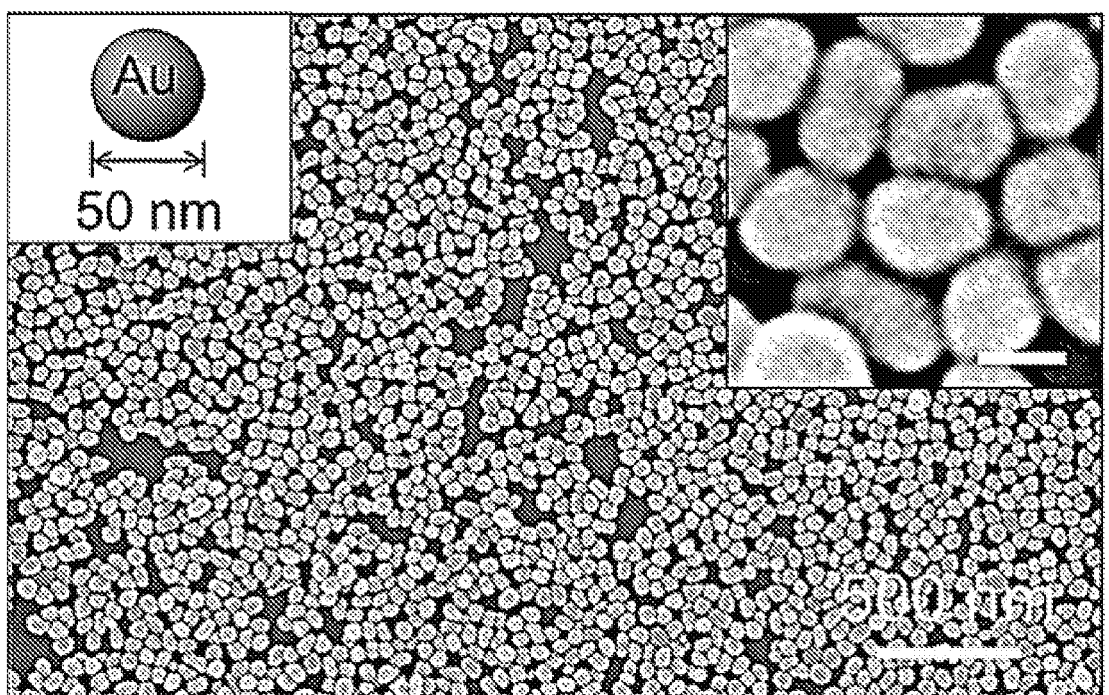
FIGS. 6A-6F show a result of observing monolayer of various nanoparticles that have been transferred to glass substrates by using a capillary tube with a scanning electron microscope in an example of the present disclosure: spherical gold nanoparticles with a size of 50 nm (FIG. 6A), spherical gold nanoparticles with a size of 17 nm (FIG. 6B), gold nanoparticles of a core-shell structure with a silica shell attached on the surface of spherical gold nanoparticles with a size of 50 nm (FIG. 6C), gold nanorods (FIG. 6D), spherical silver nanoparticles with a size of 45 nm (FIG. 6E), and spherical silver nanoparticles with a size of 30 nm (FIG. 6F).
Figure 6B:
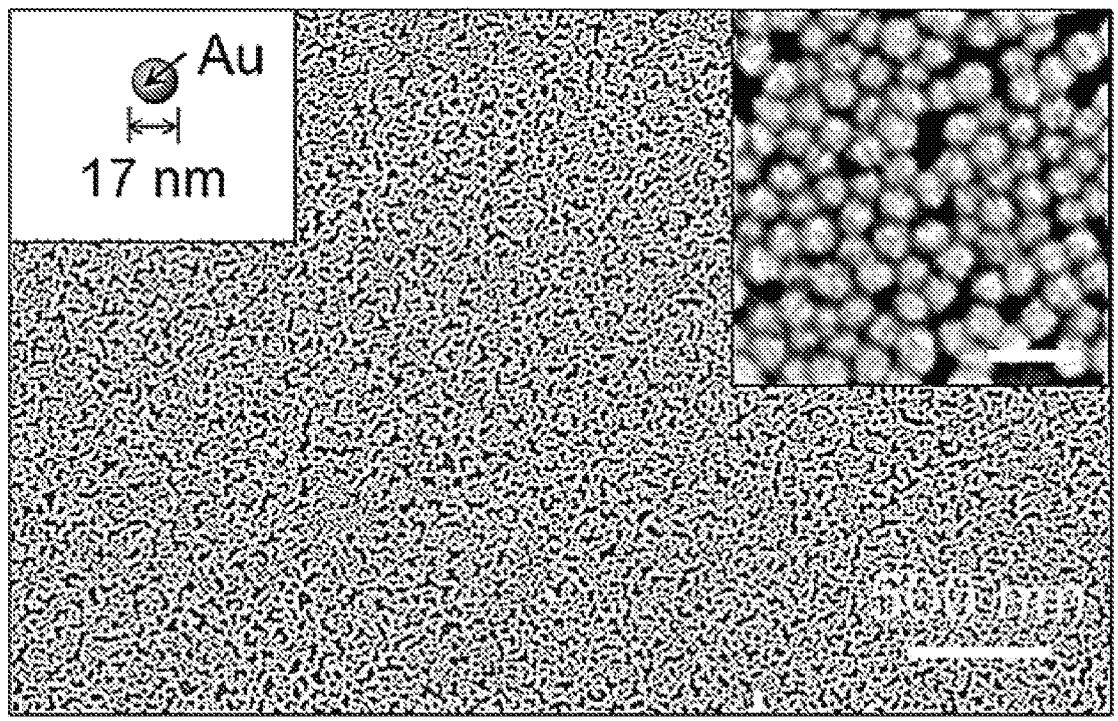
Figure 6C:
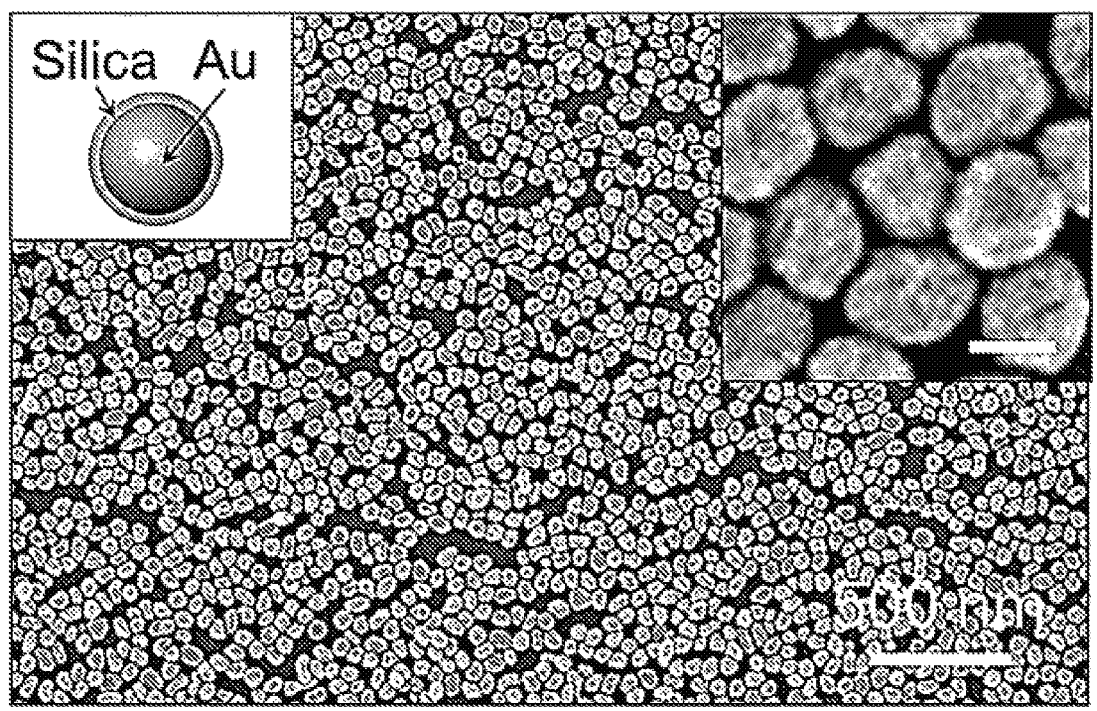
Figure 6D:
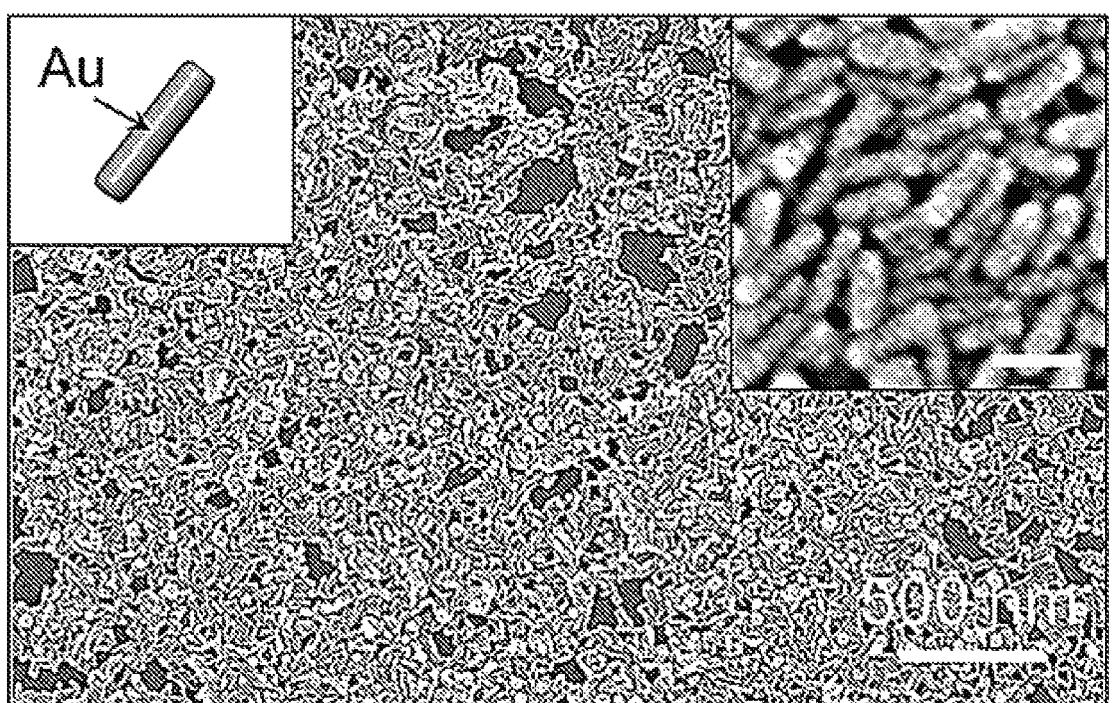
Figure 6E:
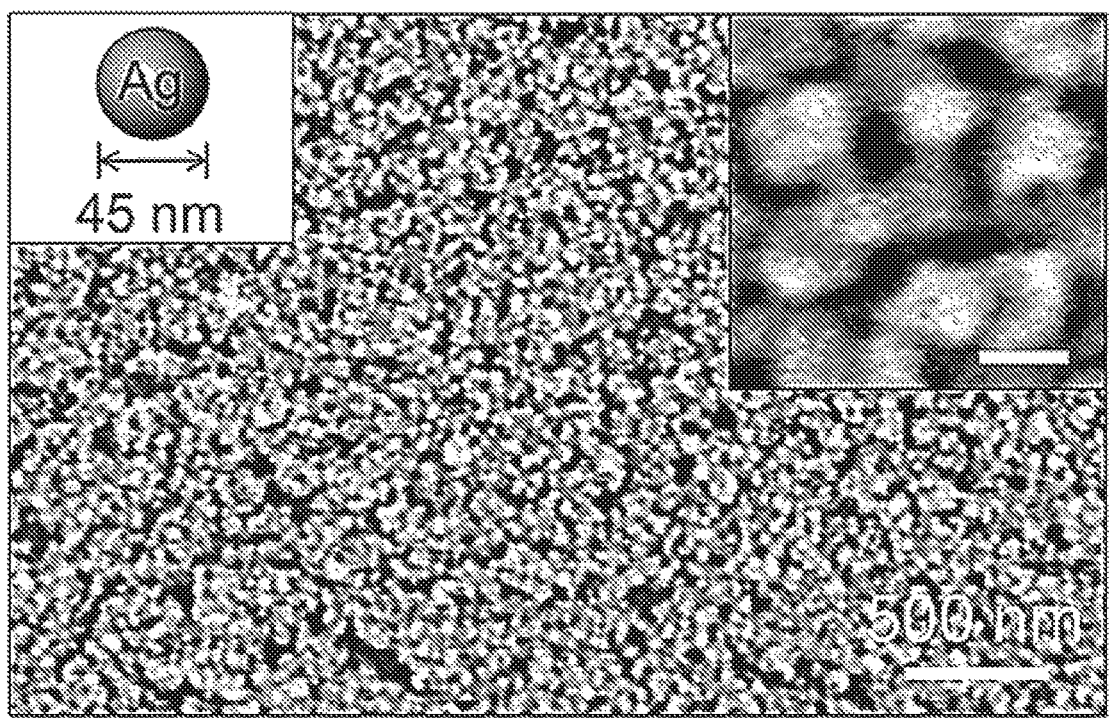
Figure 6F:
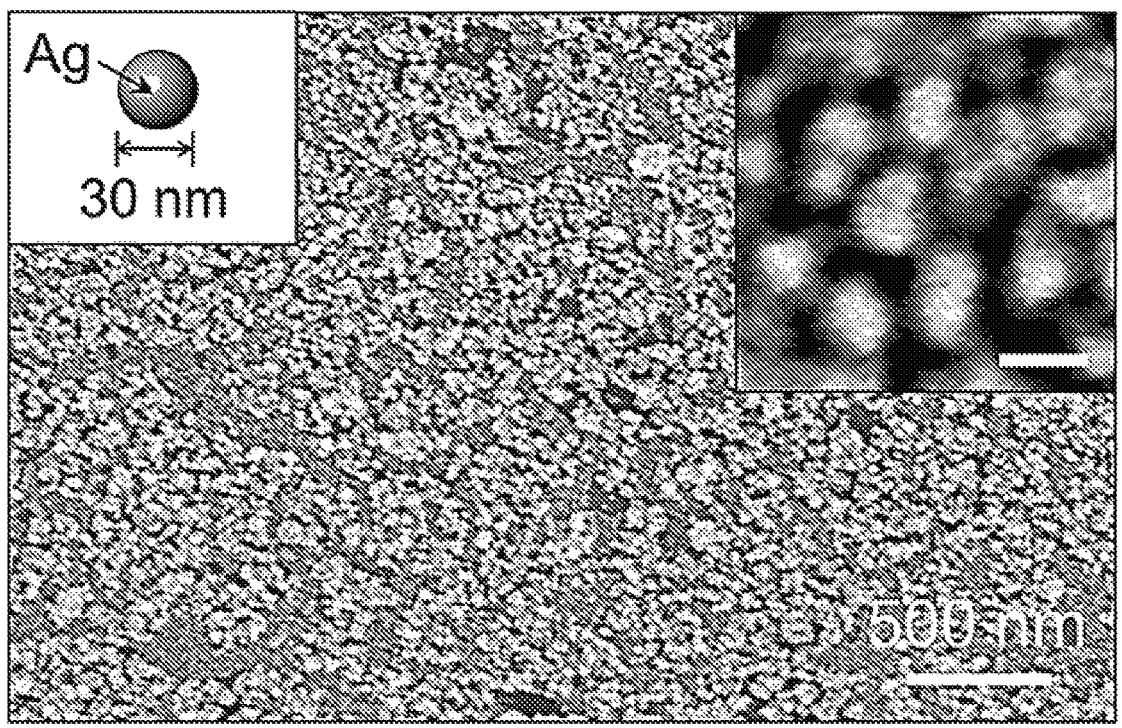

Specifically, the result of transferring for six types of different nanoparticles to a glass substrate by a transferring technique using a capillary tube and then observing with a scanning electron microscope is shown: spherical gold nanoparticles with a size of 50 nm (FIG. 6A), spherical gold nanoparticles with a size of 17 nm (FIG. 6B), gold nanoparticles of a core-shell structure with a silica shell attached on the surface of spherical gold nanoparticles with a size of 50 nm (FIG. 6C), gold nanorods (FIG. 6D), spherical silver nanoparticles with a size of 45 nm (FIG. 6E), and spherical silver nanoparticles with a size of 30 nm (FIG. 6F).

As seen from FIG. 6, it is confirmed that uniform monolayer structures where high density of particles are arranged are formed for all of the six types of nanoparticles.

Figure 7A:
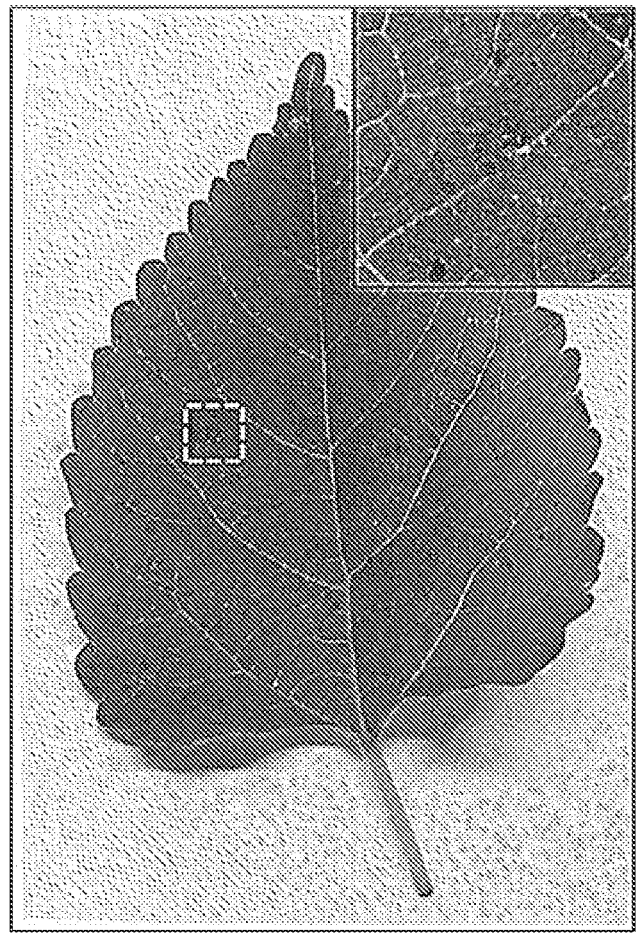
FIGS. 7A-7D show a gold nanoparticle monolayer with a size of 50 nm, which has been transferred onto the soft surface of a leaf (front and back sides) with a diameter of 1 mm in an example of the present disclosure.
Figure 7B:
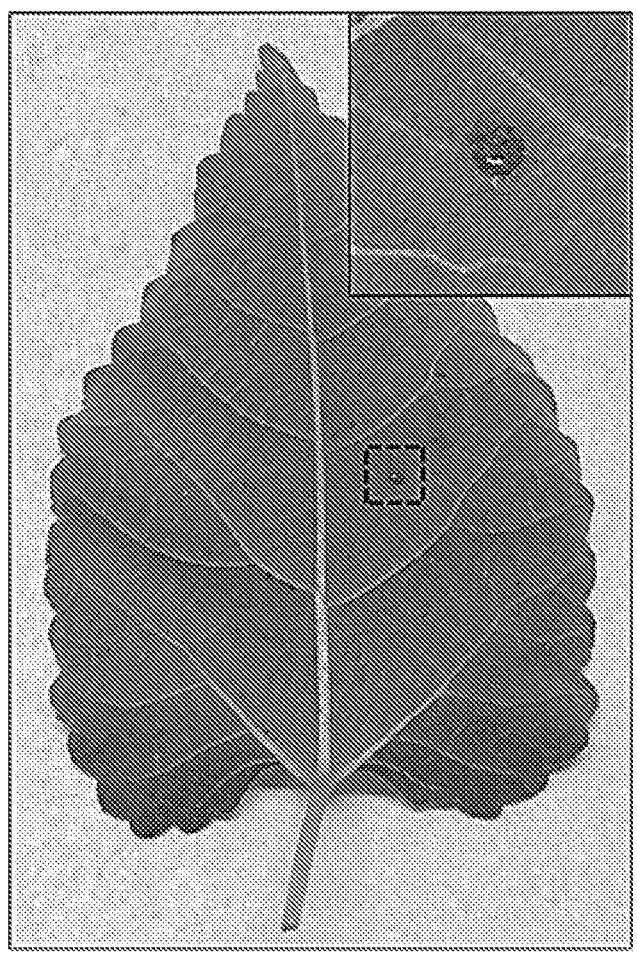
Figure 7C:
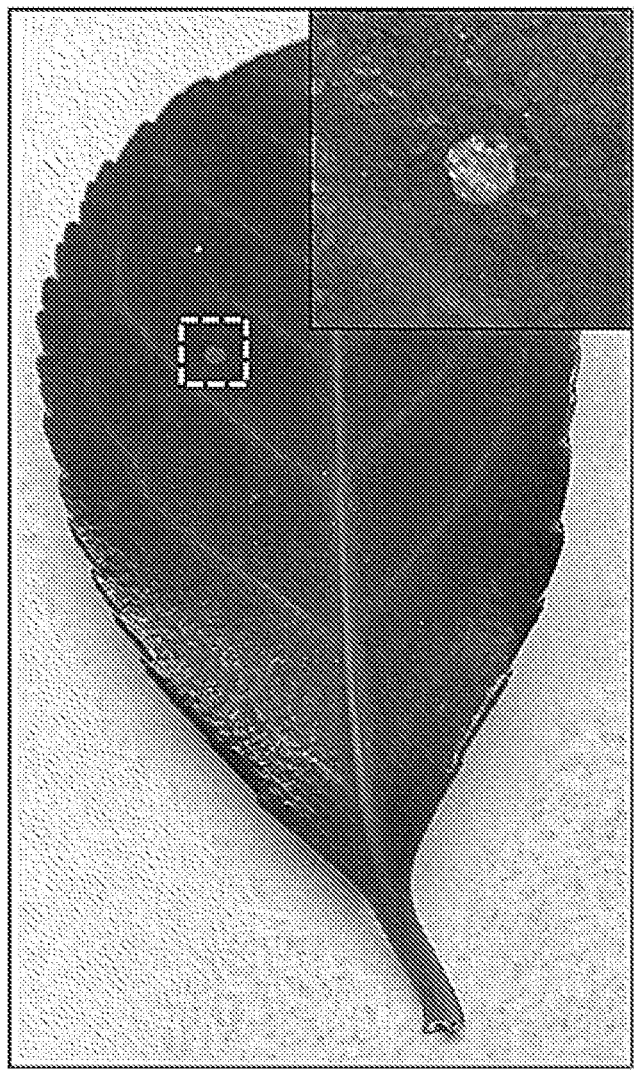
Figure 7D:
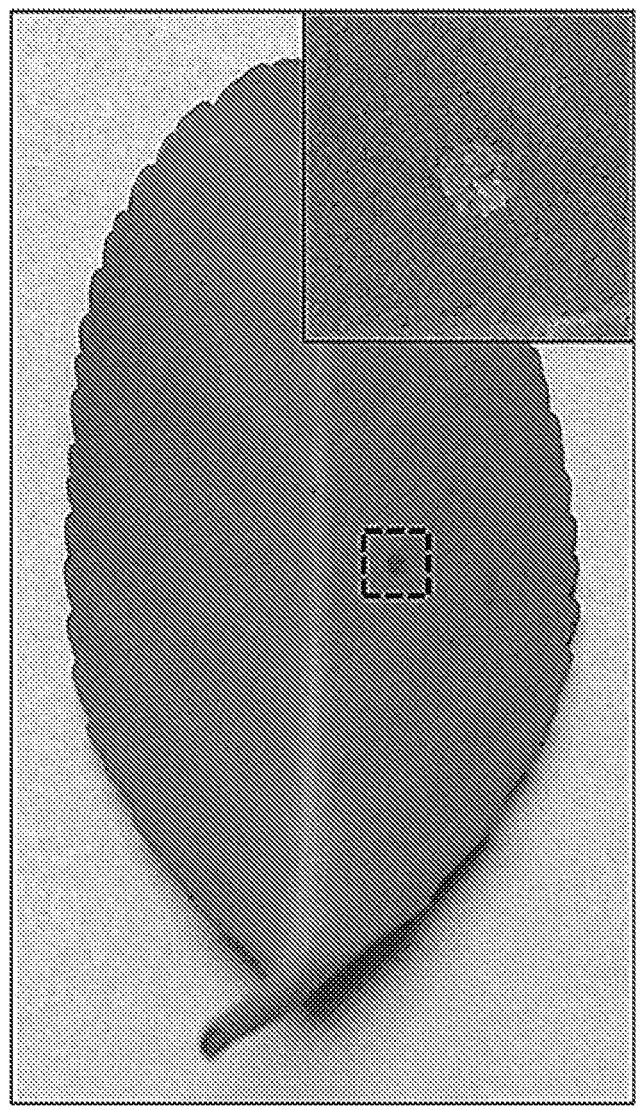

FIGS. 7A-7D show a result of transferring a nanoparticle monolayer onto a leaf surface, which is a living body substrate having a soft surface in Example of the present disclosure. FIGS. 7A and 7B show the front and back side of one leaf respectively, and FIGS. 7C and 7D show the front and back side of another leaf respectively.

As can be seen from FIG. 7, nondestructive and reproducible transfer is possible without damaging the tissue of the leaf during the transfer.

Figure 8:
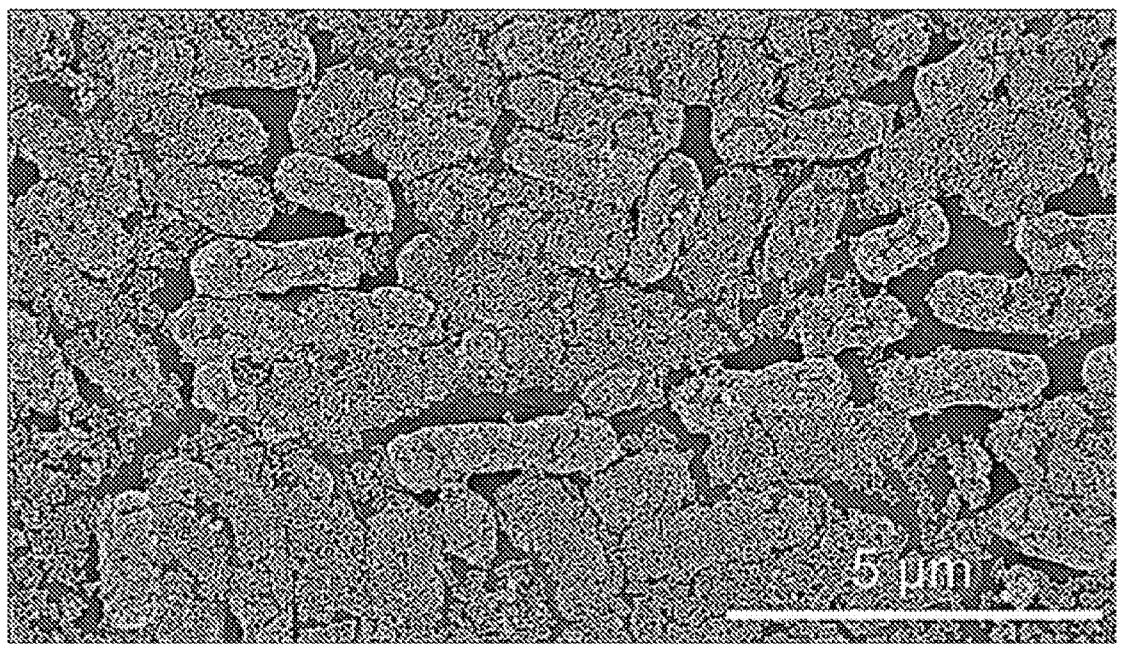
FIG. 8 shows a scanning electron microscopic image of a gold nanoparticle monolayer with a size of 50 nm, which has been transferred onto a PDMS surface where *Escherichia coli* is present with high density, in an example of the present disclosure.
Figure 9A:
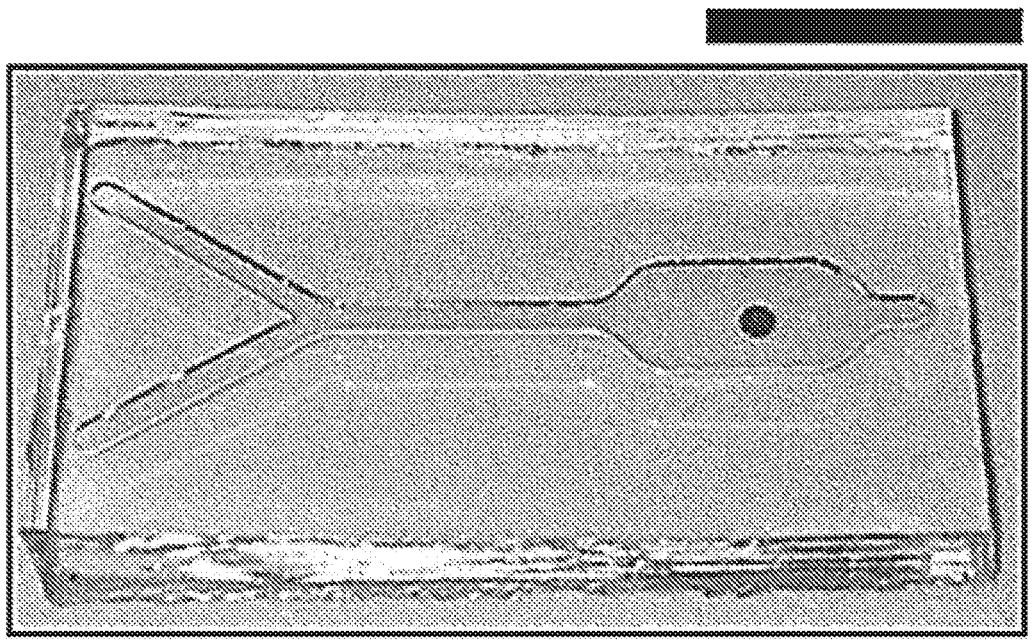
FIGS. 9A-9G show a result of fabricating various PDMS microfluidic channels with a width of 1 mm and a depth of 650 μm and then transferring a spherical gold nanoparticle monolayer with a size of 50 μm into the channels by using a capillary tube in an example of the present disclosure.
Figure 9B:
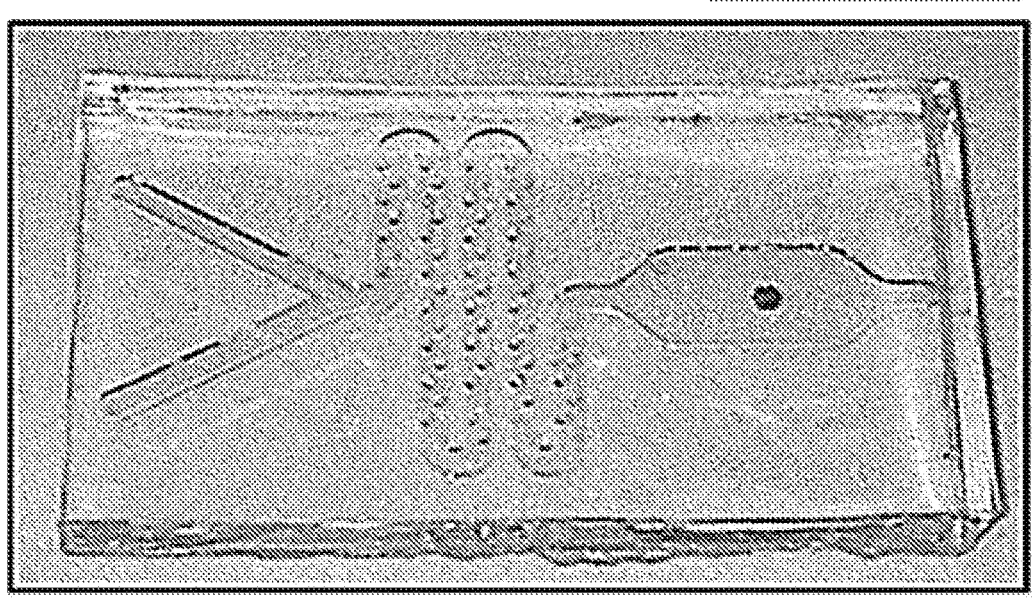
Figure 9C:
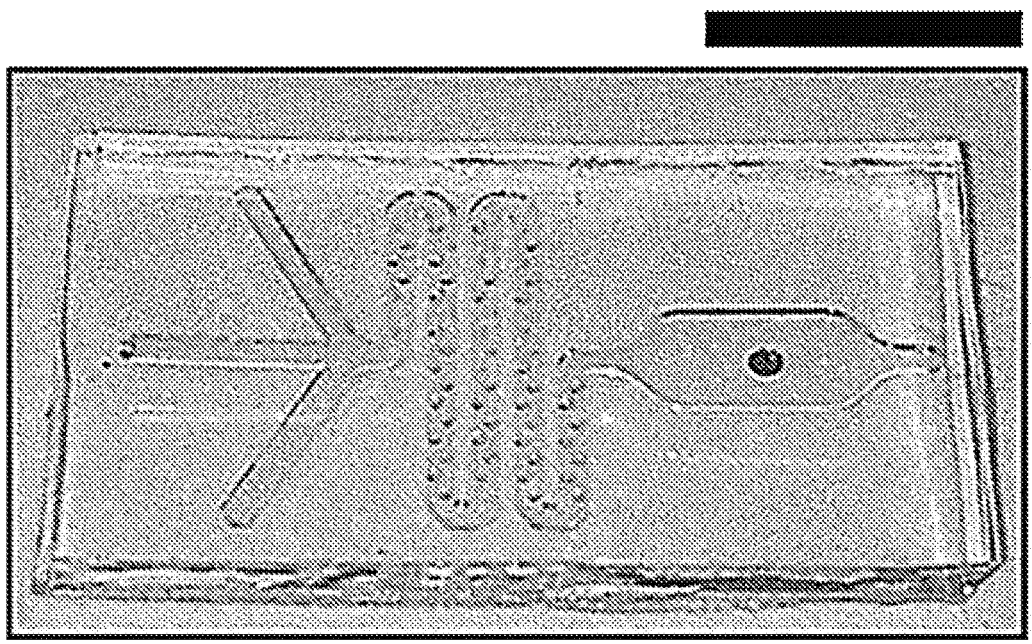
Figure 9D:
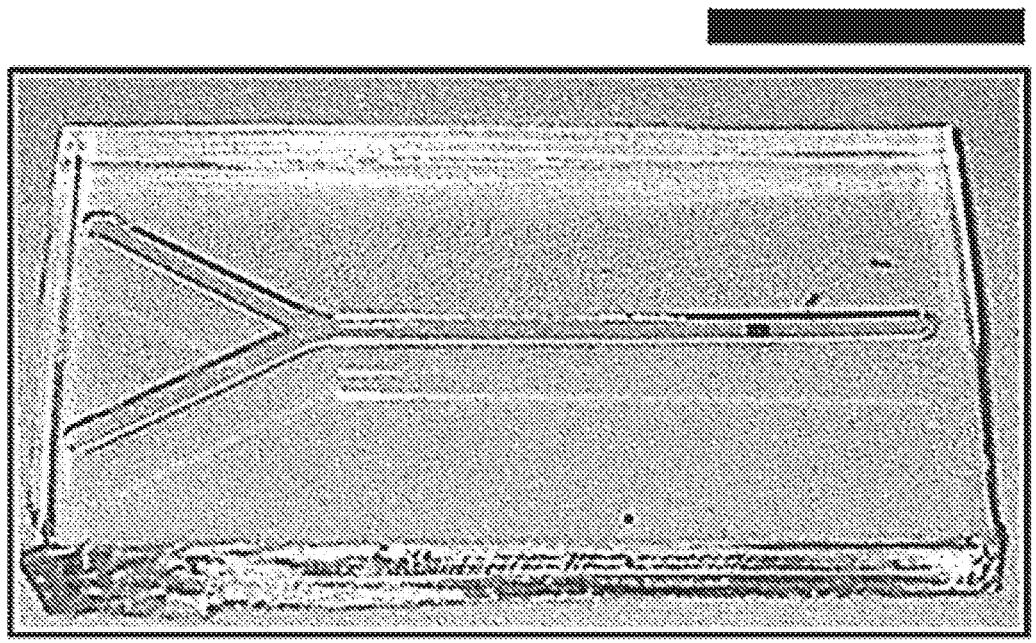
Figure 9E:
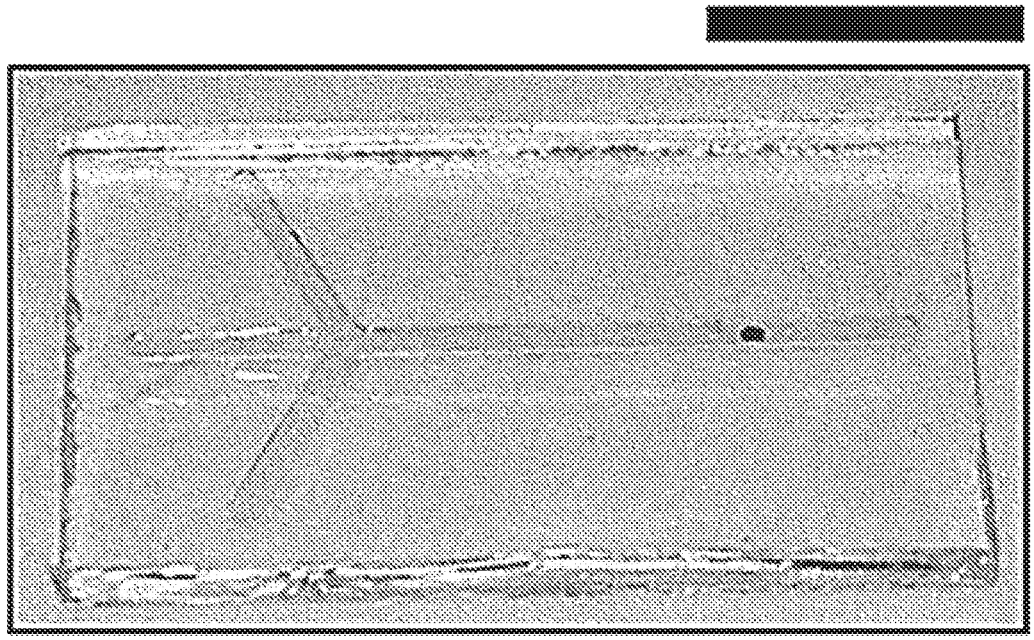
Figure 9F:
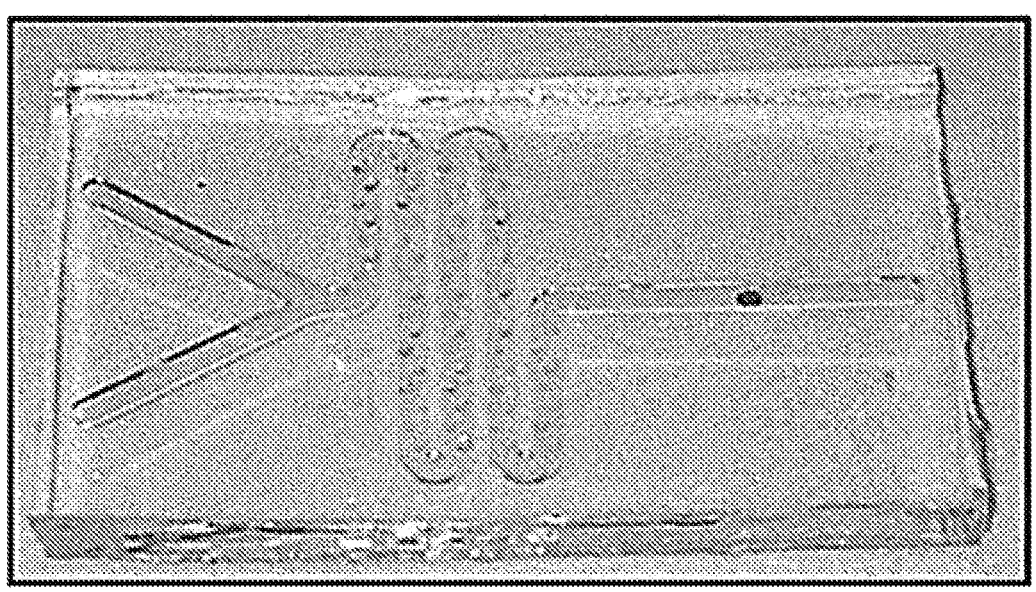
Figure 9G:
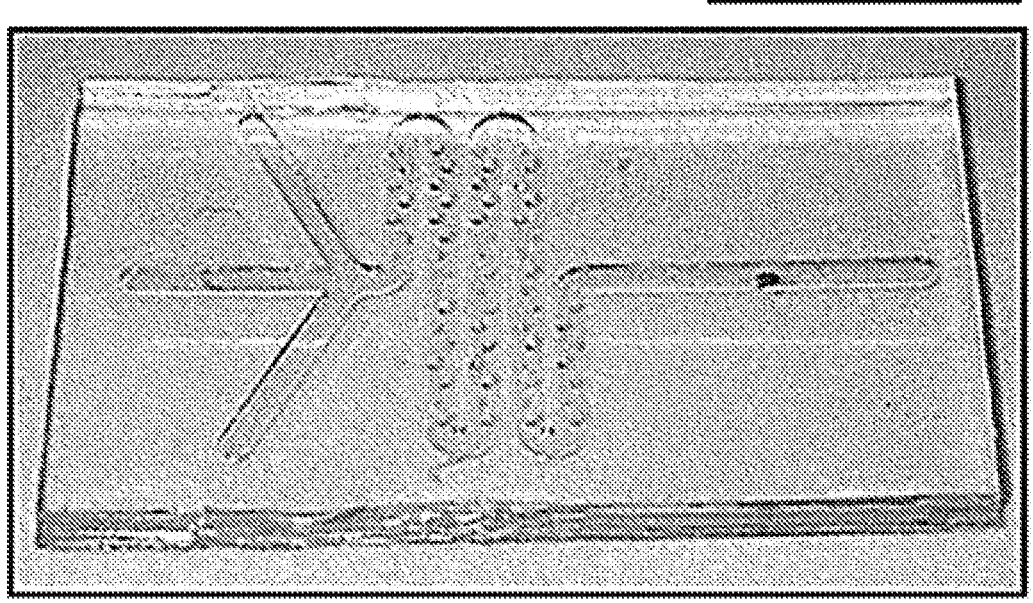

FIG. 8 shows a scanning electron microscopic image of a gold nanoparticle monolayer which has been transferred onto a PDMS surface where E. coli is coated with high density.

As can be seen from FIG. 8, the gold nanoparticle monolayer is coated uniformly on the surface of E. coli, and the E. coli maintains its cylindrical structure well without being split or destroyed since no pressure is applied during the process.

Analysis of Detection Characteristics

Detection of Rhodamine 6G Inside Microfluidic Device Through Surface-enhanced Raman Scattering After pouring a PDMS precursor into a silicon mold already formed through lithography and hardening the same, a microfluidic channel was prepared by detaching the hardened PDMS. Then, a gold nanoparticle monolayer was transferred to have a diameter of 1 mm into the channel by using a capillary tube.

As seen from FIGS. 9A-9G, the gold nanoparticle monolayer was able to be transferred precisely to desired locations into the channels having various widths and structures.

Then, while flowing a 1 mM rhodamine 6G aqueous solution into the channel, Raman signals were measured by irradiating a 785-nm laser for 3 seconds.

Figure 10:
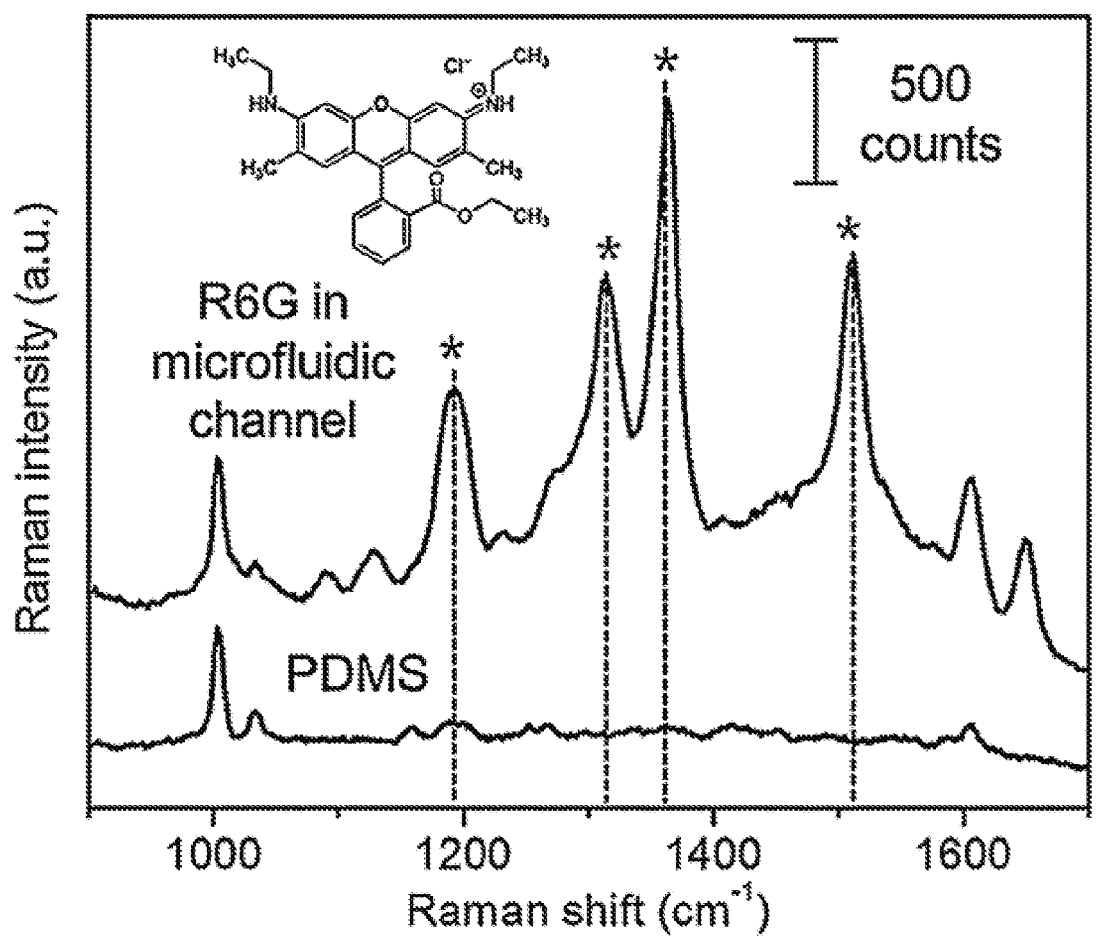
FIG. 10 shows a result of detecting 1 mM rhodamine 6G inside a microfluidic channel to which a gold nanorod monolayer has been transferred through surface-enhanced Raman scattering in an example of the present disclosure.

As seen from FIG. 10, the Raman signal of rhodamine 6G was detected inside the microfluidic channel.

Detection of Benzocaine on Surface of Fabric Through Surface-enhanced Raman Scattering As for a substitute similar in chemical structure with the illegal drug cocaine, 30 µL of a benzocaine solution (10 µM) was dropped onto a surface of a clothing having a fibrous structure and then dried completely. Then, a spherical gold nanoparticle monolayer with a size of 50 nm was transferred by using a capillary tube.

Figure 11:
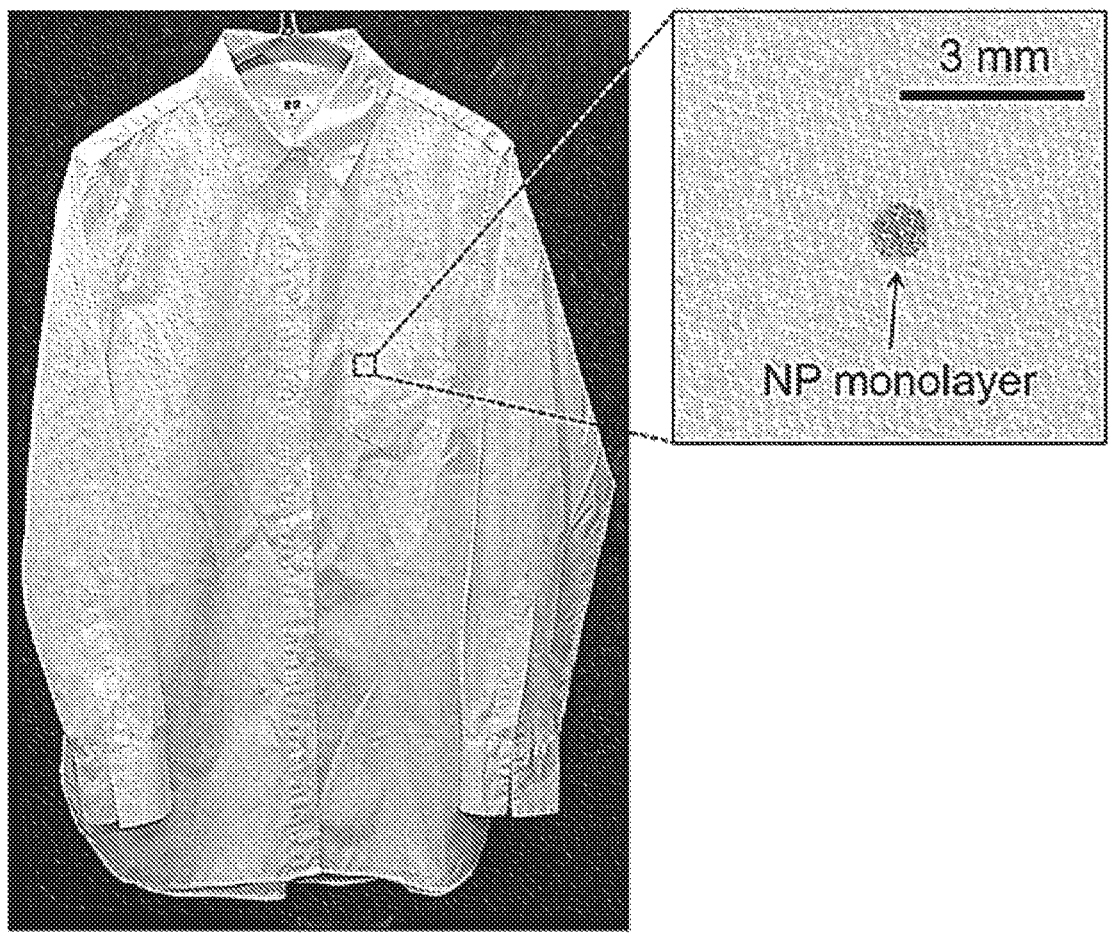
FIG. 11 shows a result of transferring a spherical gold nanoparticle monolayer with a size of 50 nm to a textile fabric of clothing surface so as to have a diameter of 1 mm by using a capillary tube in an example of the present disclosure.

As seen from FIG. 11, it was confirmed that the nanoparticle monolayer could be transferred with a diameter of 1 mm with reproducibility even onto a rough surface of clothing having a fibrous structure.

Figure 12:
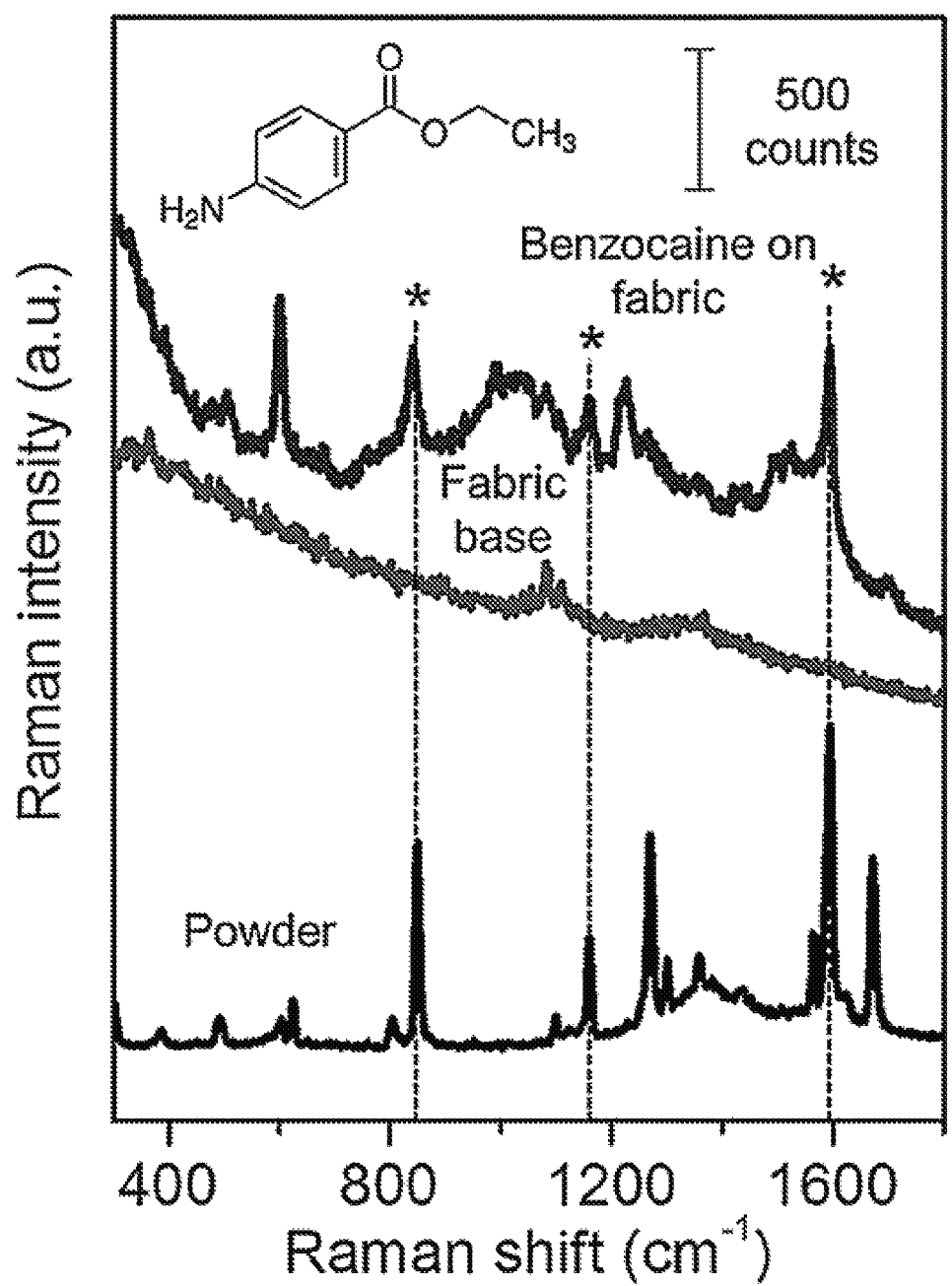
FIG. 12 shows a result of detecting benzocaine from a spherical gold nanoparticle monolayer which has been transferred to a surface of clothing having the benzocaine, a cocaine-like drug, through surface-enhanced Raman scattering in an example of the present disclosure.

As seen from FIG. 12, when a 785-nm laser was irradiated, the Raman signal of benzocaine occurred selectively only in the region where the nanoparticle monolayer existed, whereas no benzocaine signal was observed in the region without the nanoparticle monolayer.

Detection of Harmful Material From Food Surface Through Surface-enhanced Raman Scattering 30 µL of a commercially available agrochemical (Reldan) aqueous solution was dropped onto a surface of a rice grain and orange peel having large surface curvature and roughness and then dried completely. Then, a spherical gold nanoparticle monolayer with a size of 50 nm was transferred by using a capillary tube.

Figure 13:
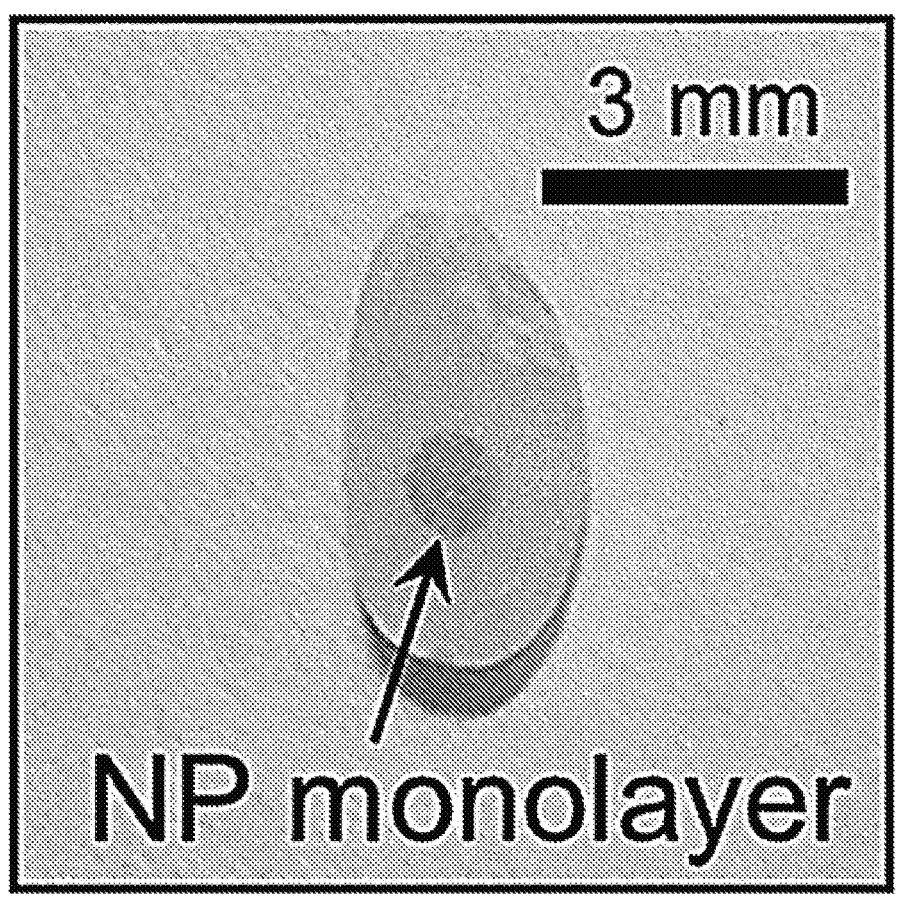
FIG. 13 shows a spherical gold nanoparticle monolayer with a size of 50 nm which has been transferred to a surface of rice grain so as to have a diameter of 1 mm by using a capillary tube in an example of the present disclosure.

As seen from FIG. 13, it was confirmed that the nanoparticle monolayer with a diameter of 1 mm as transferred onto the surface of the rice grain with a large curvature and small size.

Figure 14:
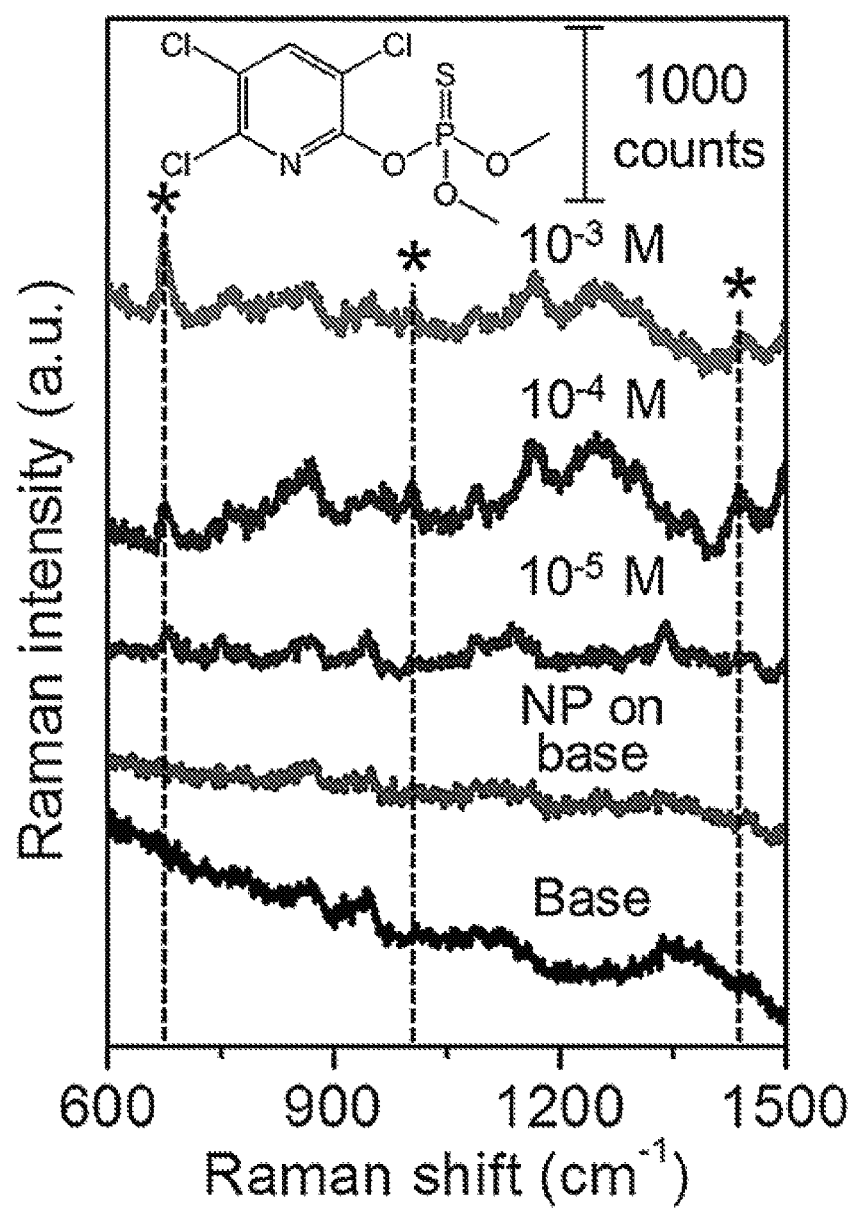
FIG. 14 shows a result of detecting chlorpyrifos-methyl, which is an agrochemical, from a spherical gold nanoparticle monolayer which has been transferred to a surface of rice grain having the commercially available agrochemical through surface-enhanced Raman scattering in an example of the present disclosure.

FIG. 14 shows that the Raman signal of the agrochemical (chlorpyrifos-methyl) occurs selectively only in the region of the nanoparticle monolayer on the rice grain surface. The lower limit of detection was 10 μM, which shows that the agrochemical can be detected sensitively even for a much smaller amount than the recommended concentration of the agrochemical, 0.7-1.4 mM.

Figure 15:
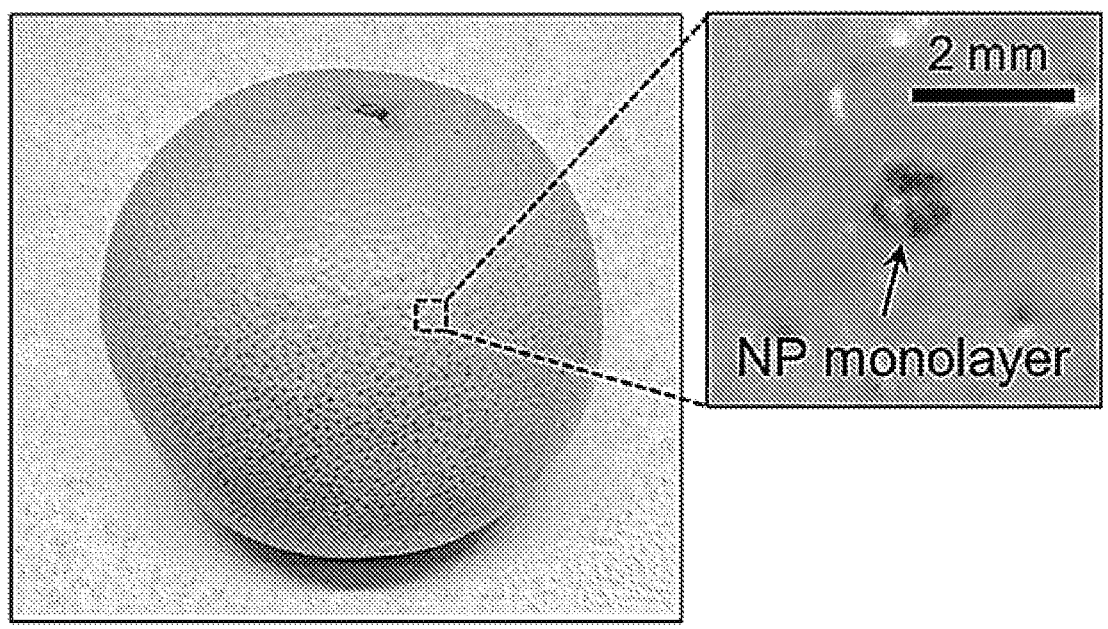
FIG. 15 shows a spherical gold nanoparticle monolayer with a size of 50 nm which has been transferred to a surface of orange peel so as to have a diameter of 1 mm by using a capillary tube in an example of the present disclosure.

FIG. 15 shows that the nanoparticle monolayer was transferred to the surface of orange peel with a large curvature and rough surface, like the rice grain.

Figure 16:
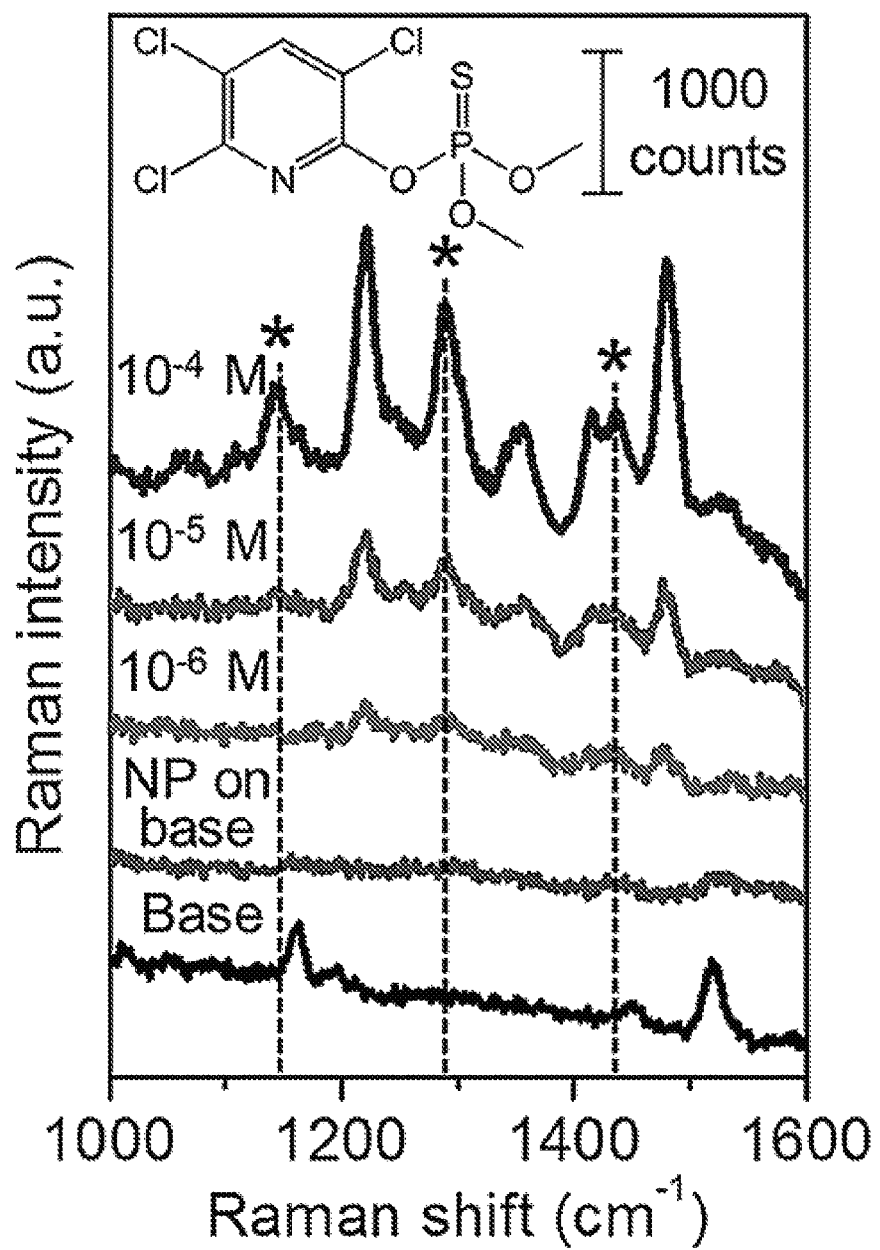
FIG. 16 shows a result of detecting chlorpyrifos-methyl, which is an agrochemical, from a spherical gold nanoparticle monolayer which has been transferred to a surface of orange peel having the commercially available agrochemical through surface-enhanced Raman scattering in an example of the present disclosure.

FIG. 16 shows the Raman signals occurring on the orange peel when a 785-nm laser was irradiated. Likewise in the rice grain, the Raman signal of the agrochemical occurred only in the region of the nanoparticle monolayer. The lower limit of detection was 1 μM, which shows that the agrochemical can be detected sensitively even for a much smaller amount than the recommended concentration of the agrochemical, 0.7-1.4 mM.

Figure 17:
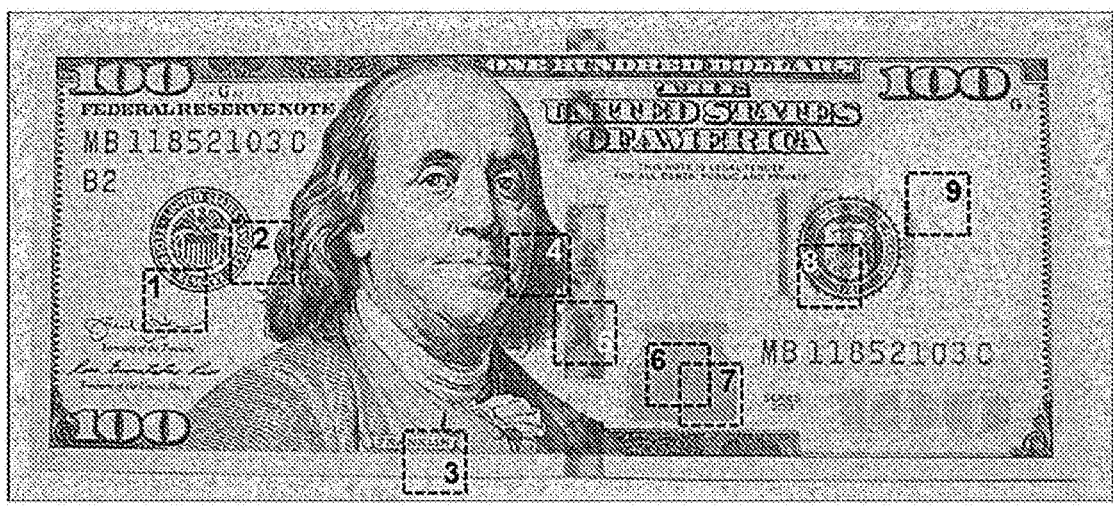
FIG. 17 shows several spots on a US 100-dollar bill to which chemical codes for preventing counterfeit banknotes are to be inserted in an example of the present disclosure.
Figure 18A:
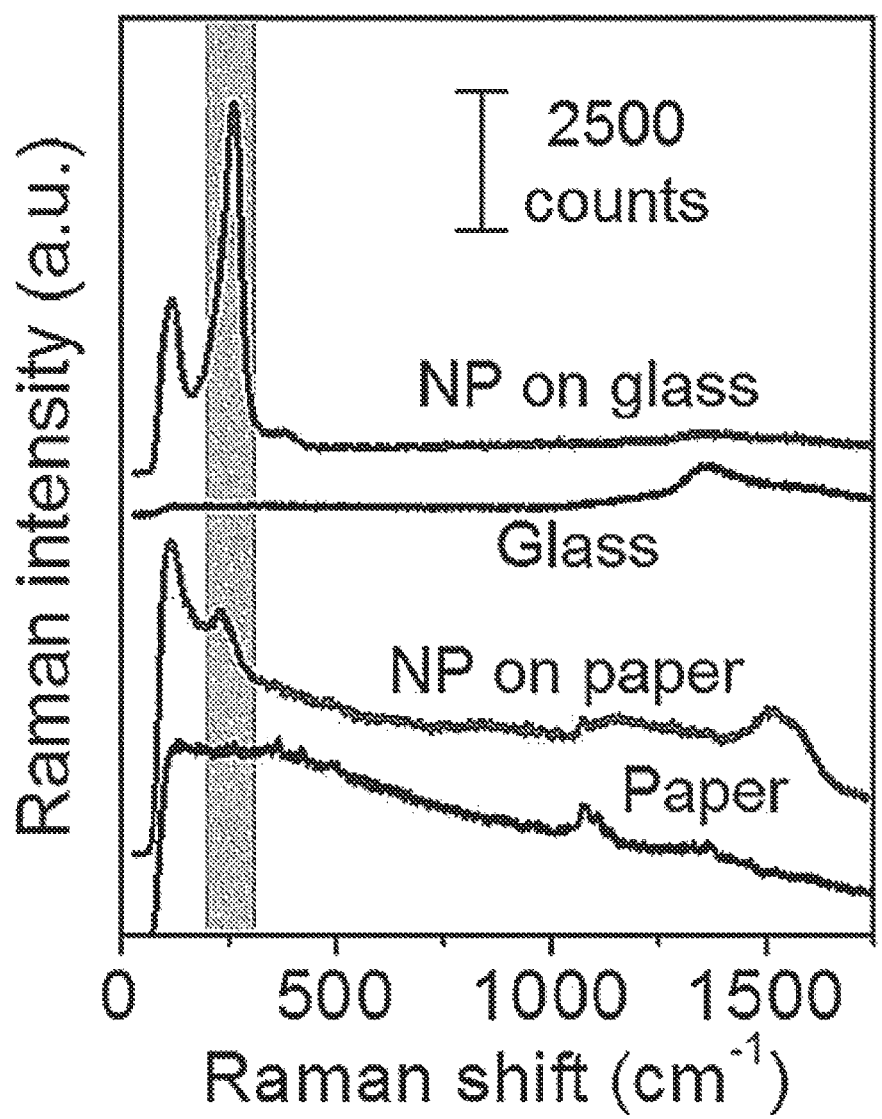
FIGS. 18A-18J show a result of Raman signal measurement showing that a strong peak occurs in common near 250 $cm^{-1}$ from all locations of gold nanoparticle monolayers which have been transferred to a 100-dollar bill in an example of the present disclosure.
Figure 18B:
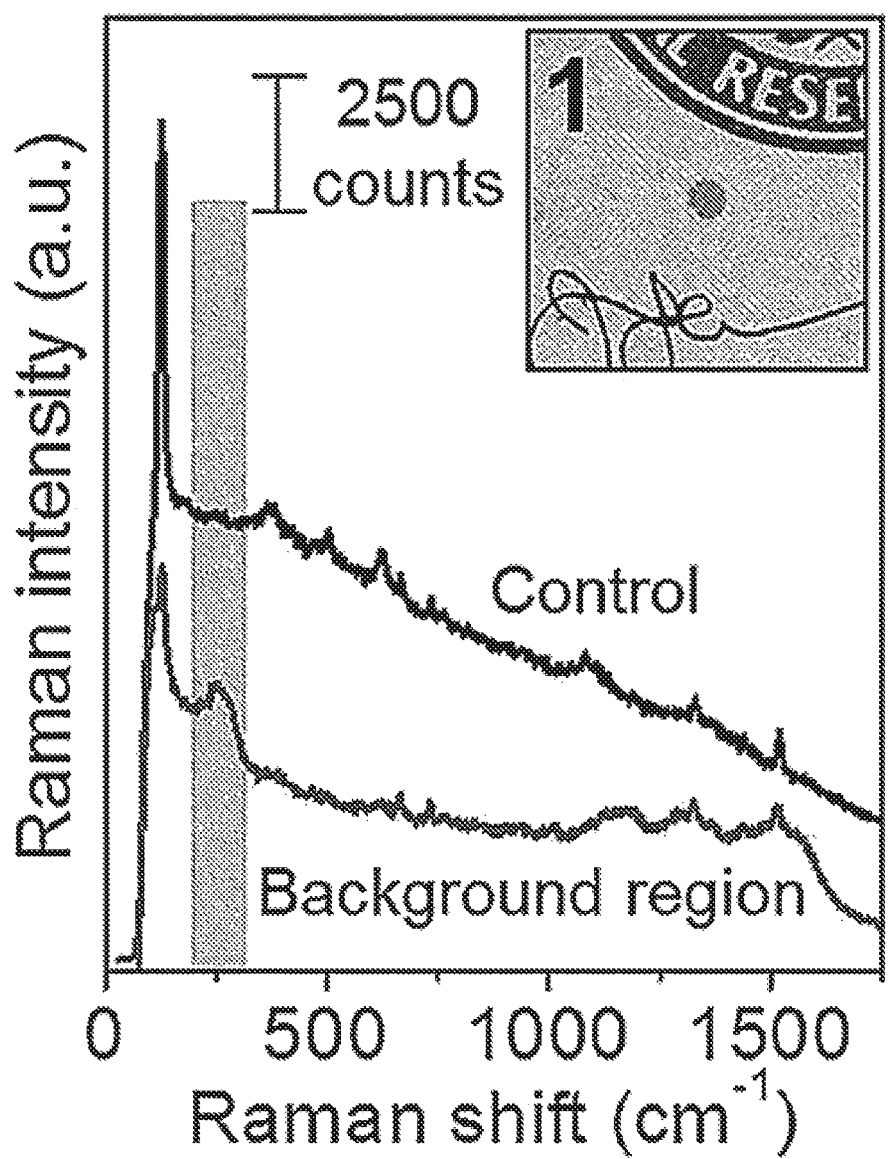
Figure 18C:
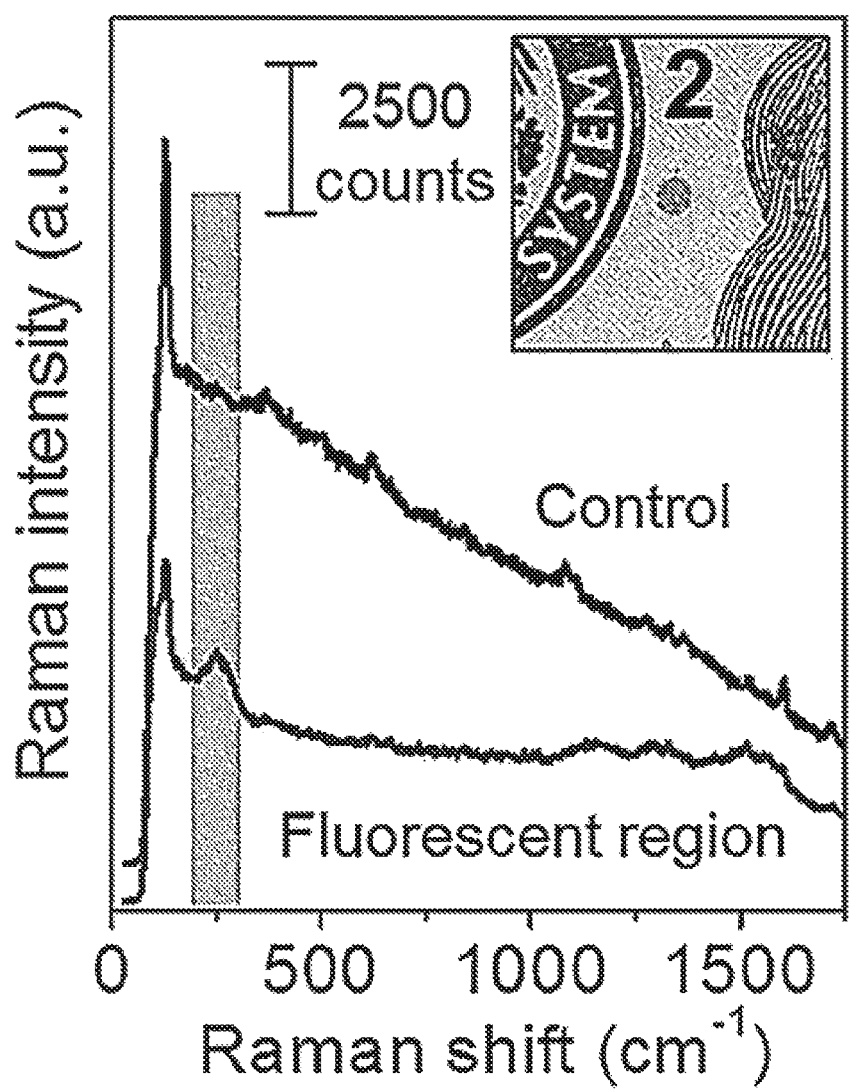
Figure 18D:
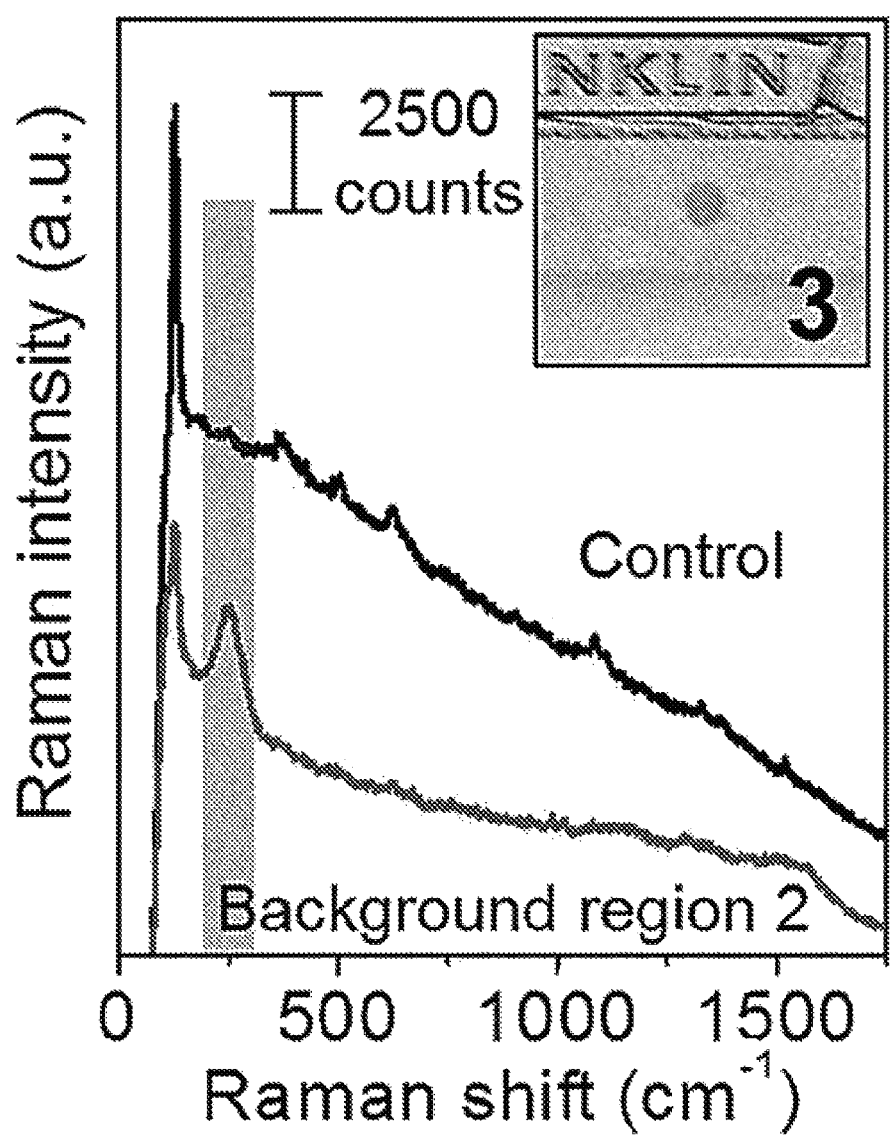
Figure 18E:
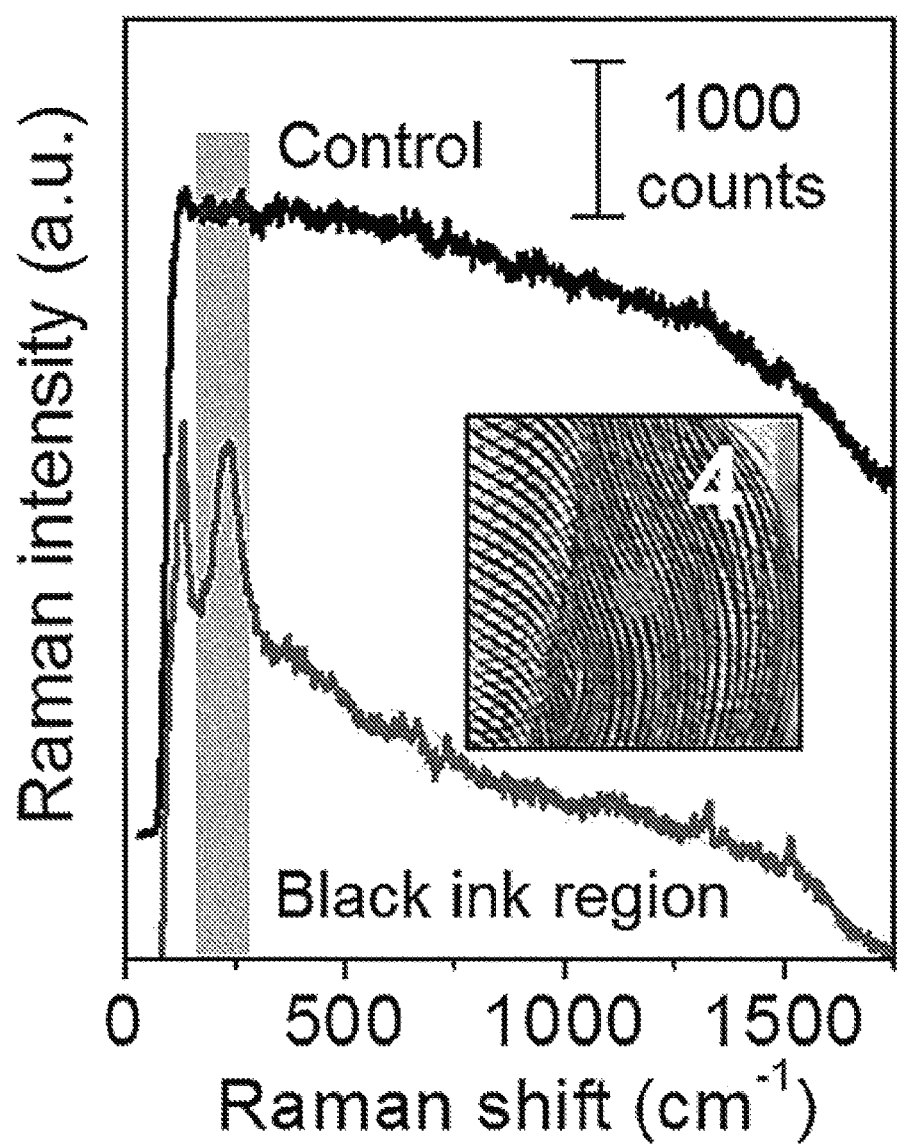
Figure 18F:
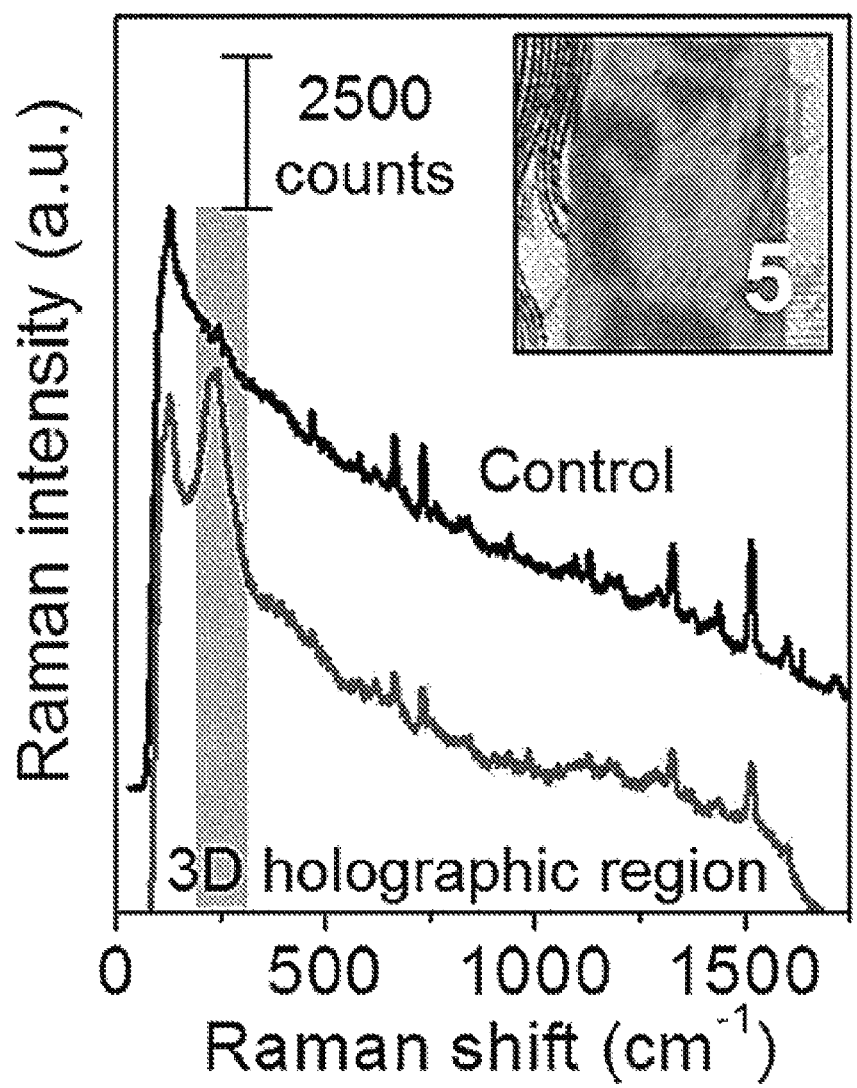
Figure 18G:
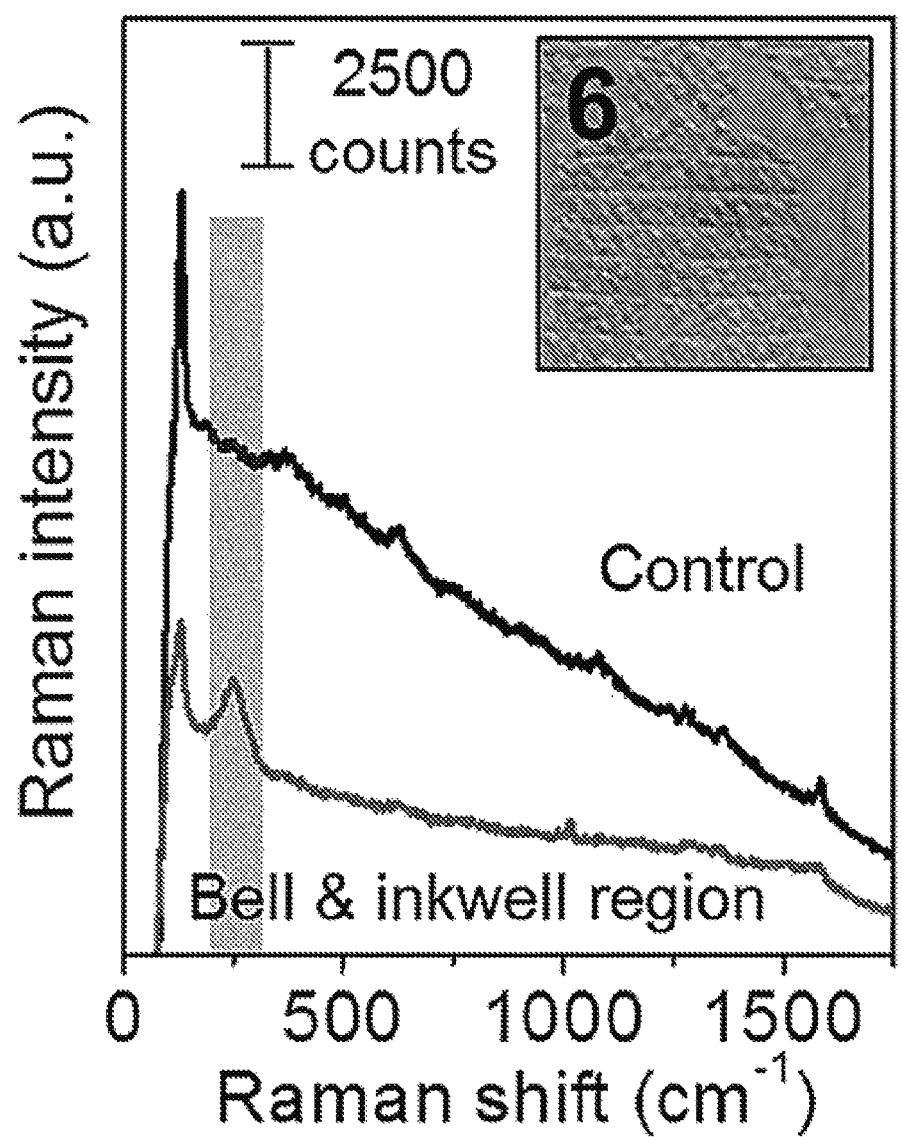
Figure 18H:
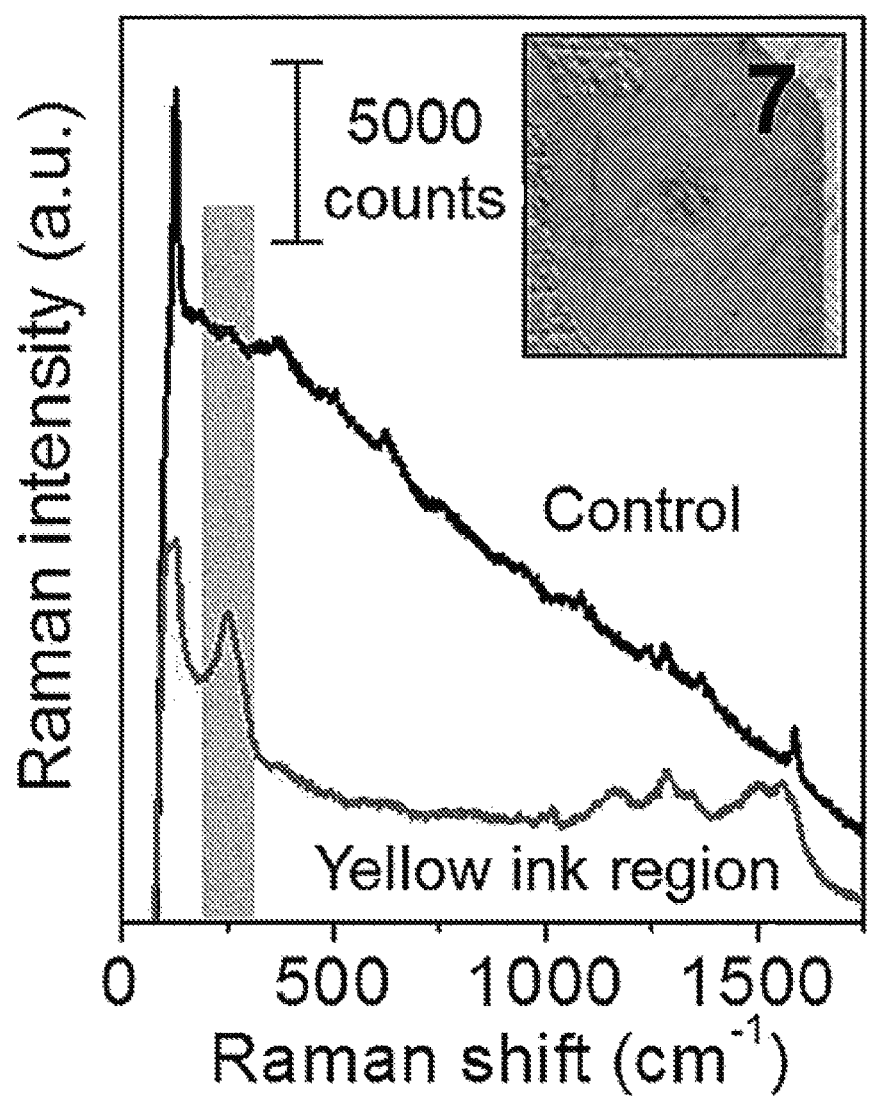
Figure 18I:
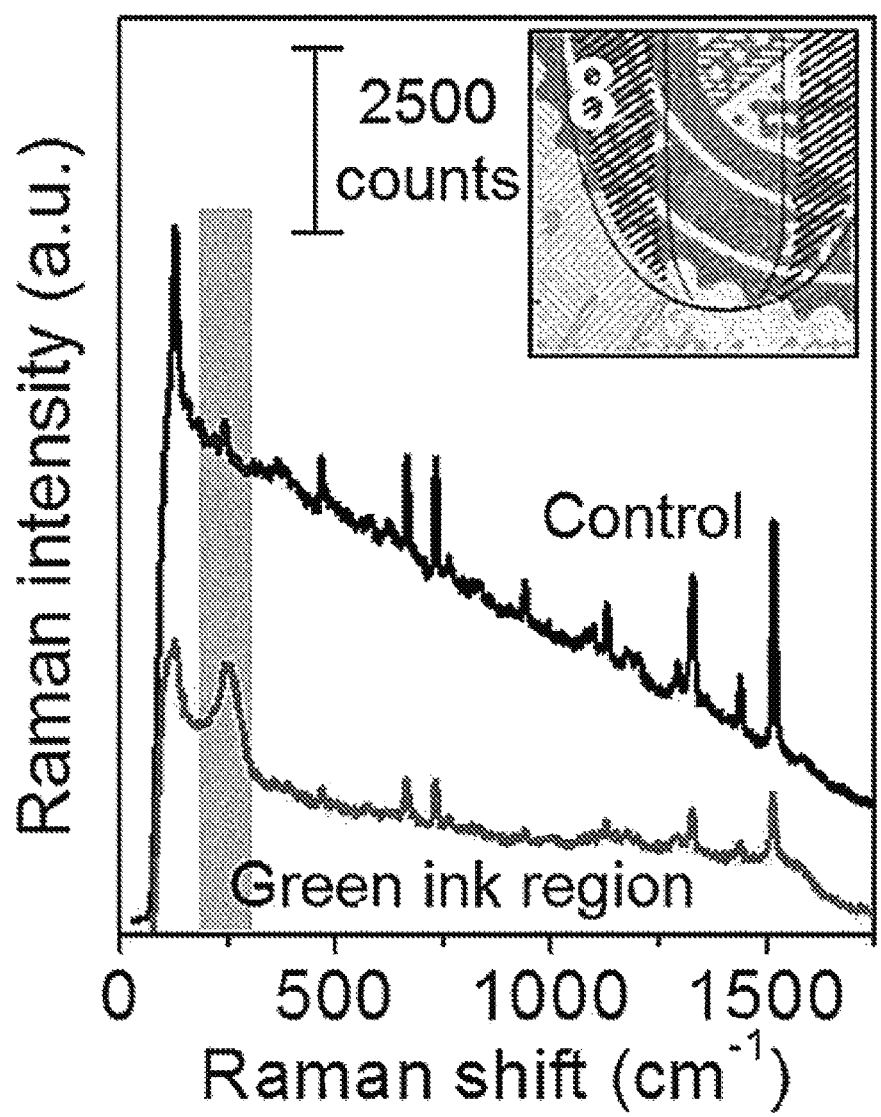
Figure 18J:
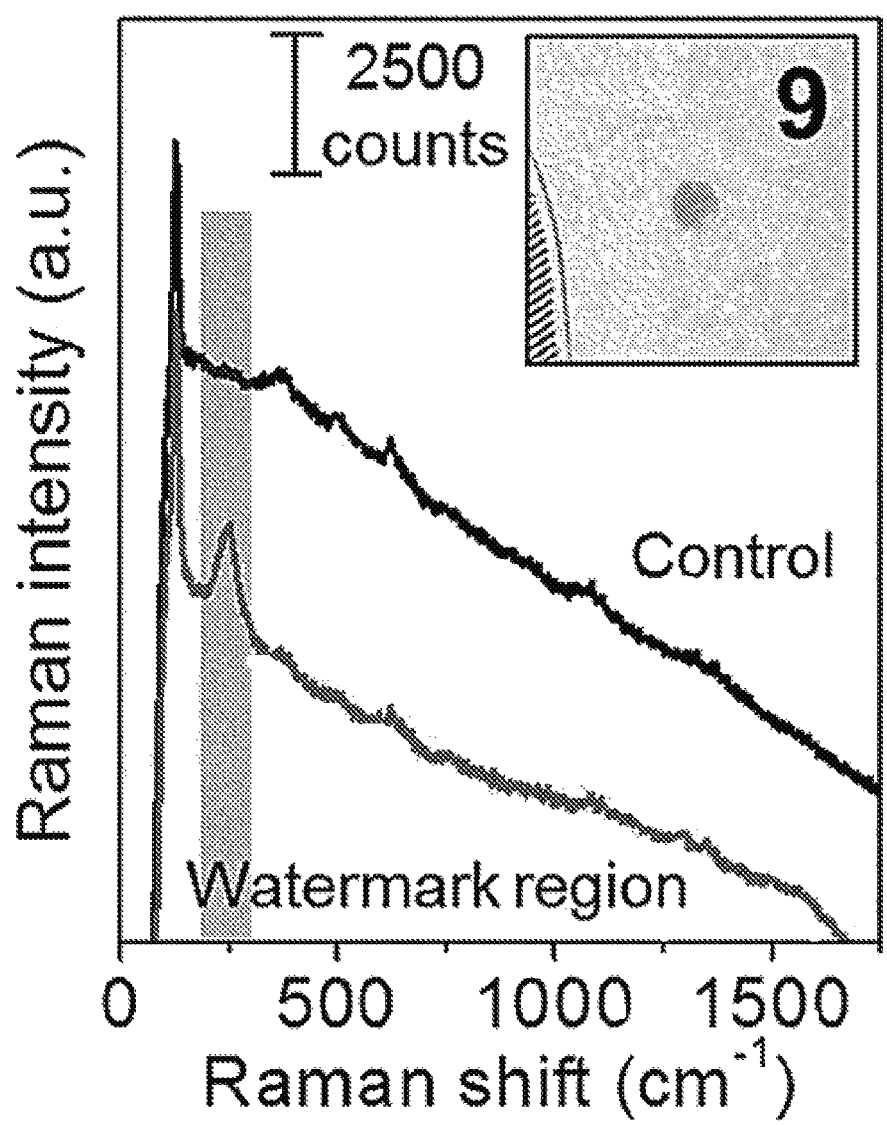

Insertion of Chemical Code Onto Banknote Surface for Prevention of Counterfeiting As shown in FIG. 17, after transferring a spherical gold nanoparticle monolayer with a size of 50 nm to several locations on the surface of a US 100-dollar bill to have an area with a diameter of 1 mm, surface-enhanced Raman scattering signals were observed by irradiating a 785-nm laser for 3 seconds.

FIGS. 18A-18J show that strong Raman signals were observed around 250 $cm^{-1}$ at all the locations where the gold nanoparticle monolayers was transferred onto the 100-dollar bill.

FIGS. 18A-18J show that the characteristic optical signals of gold nanoparticles are observed from the spherical gold nanoparticle monolayers with a size of 50 nm, which have been transferred to various locations on the 100-dollar bill, which suggests that the potential technique for preventing counterfeit banknote is possible based on this.

The signals are signals due to the Au—O bonding of the gold nanoparticles. This result suggests that the nanoparticle monolayer transferred onto a banknote by using a capillary tube can serve as a small-area code exhibiting a non-counterfeitable, characteristic chemical signal.

As described above, the method for transferring a nanoparticle monolayer by using a capillary tube according to exemplary embodiments of the present disclosure is advantageous in that reproducible transfer is possible regardless of the surface properties and structures of substrates and the method is widely applicable in terms of nanoparticle type, transfer location, transfer area, etc.

In addition, the nanoparticle monolayer may be used as a probe of an optical sensor. Since the diameter of laser-irradiated area is micrometer scale in general, the existing large-area transfer method exhibits low efficiency in number of nanoparticles per laser-irradiated area.

In contrast, according to the exemplary embodiments of the present disclosure, the efficiency in number of nanoparticles per laser-irradiated area can be improved greatly because a nanoparticle monolayer may be transferred to have an area similar to the laser-irradiated area, e.g., an area with a diameter of 1 mm or less.

In addition, transfer is possible regardless of the composition and shape of nanoparticles. For example, as shown in FIG. 6, effective transfer is possible for spherical gold nanoparticles having different sizes, as well as a gold nanorod with a different shape, a core-shell nanoparticle with a silica shell attached on the surface, and silver nanoparticles with a different composition etc.

In addition, there is an advantage that transfer is possible regardless of the composition and shape of the target solid substrate. For example, nanoparticles were transferred effectively onto glass and PDMS substrates, which are representative materials having hydrophilic and hydrophobic surface properties, respectively. In addition, transfer was possible even onto a rough surface or a surface with large curvature due to small transfer area.

Additionally, because the nanoparticle monolayer is transferred through contact between the substrate surface and the liquid interface, nondestructive transfer is possible even onto a substrate with soft surface that may be destroyed in its structure upon application of pressure or onto a substrate requiring delicate manipulation.

In addition, it is advantageous in that the transfer process is simple when compared with the existing nanometer-scale lithography, electrochemical deposition or Langmuir-Blodgett method, without requiring especial equipment or high-level expertise of experimenter.

In addition, simple and complex patterning is possible by using a bundle of capillary tubes, and it is expected that an automated process can be also achieved by using benchtop equipment.

The method for transferring a nanoparticle monolayer by using a capillary tube according to exemplary embodiments of the present disclosure may be applicable to food safety inspection, in-situ high-speed inspection of illegal drugs as well as a technique for preventing banknote counterfeiting by transferring a nanoparticle monolayer onto various solid surfaces such as textile clothing, various food, cells, paper such as banknotes, etc. It is expected to greatly extend the application of nanoparticles with precisely controlled structures in various fields requiring fast and sensitive molecule detection.

INDUSTRIAL APPLICABILITY

According to exemplary embodiments of the present disclosure, a nanoparticle monolayer can be transferred relatively uniformly regardless of the surface properties and structure of a solid substrate by a simple method without special equipment. Accordingly, the application of the nanoparticle monolayer transfer, which has been restricted to laboratory environments, can be extended greatly for in-situ detection in various fields such as biomedicine, forensic medicine, food, drugs, etc.

The invention claimed is:

1. A method for transferring a nanoparticle monolayer, comprising:
   separating and transferring a nanoparticle monolayer to a substrate by using a capillary tube.

2. The method for transferring a nanoparticle monolayer according to claim 1, which comprises:
   a step of forming the nanoparticle monolayer at a liquid-gas interface;
   a step of separating the nanoparticle monolayer into the capillary tube by contacting the capillary tube with the liquid-gas interface; and a step of transferring the nanoparticle monolayer in the capillary tube to a substrate.

3. The method for transferring a nanoparticle monolayer according to claim 2, wherein the nanoparticle monolayer is formed at the liquid-liquid interface through self-assembly of nanoparticles, and then the nanoparticle monolayer is formed at the liquid-gas interface by evaporating the upper liquid.

4. The method for transferring a nanoparticle monolayer according to claim 2, wherein the nanoparticle monolayer is contained in the capillary tube by contacting the capillary tube with the interface, and then the nanoparticle monolayer in the capillary tube is transferred to the substrate by inverting the capillary tube and contacting the capillary tube with the substrate.

5. The method for transferring a nanoparticle monolayer according to claim 4, wherein van der Waals force or electrostatic attraction is exerted between the nanoparticle monolayer and the substrate.

6. The method for transferring a nanoparticle monolayer according to claim 2, wherein the nanoparticle monolayer is formed at a water-air interface.

7. The method for transferring a nanoparticle monolayer according to claim 2, wherein the transferred nanoparticle monolayer has an area of 4 mm$^2$ or less.

8. The method for transferring a nanoparticle monolayer according to claim 2, wherein the transferred nanoparticles have a diameter of 5-200 nm.

9. The method for transferring a nanoparticle monolayer according to claim 2, wherein the transferred nanoparticle is one or more nanoparticle selected from a metal, an inorganic material or a polymer.

10. The method for transferring a nanoparticle monolayer according to claim 9, wherein the metal is one or more selected from a group consisting of Au, Ag, Pd, Pt, Al, Cu, Co, Cr, Mn, Ni and Fe, wherein the inorganic material is one or more selected from a group consisting of silica, a quantum dot, a lanthanide and iron oxide and the polymer is one or more of polystyrene or polyethylene glycol.

11. The method for transferring a nanoparticle monolayer according to claim 2, wherein the transferred nanoparticle has one or more shape selected from a group consisting of a sphere, a rod, an ellipsoid, a dendrimer, a tetrahedron, a hexahedron, an octahedron, a 2-dimensional quadrangle and a 2-dimensional triangle.

12. The method for transferring a nanoparticle monolayer according to claim 2, wherein the substrate is a hydrophilic or hydrophobic substrate.

13. The method for transferring a nanoparticle monolayer according to claim 2, wherein the substrate is a curved substrate.

14. The method for transferring a nanoparticle monolayer according to claim 2, wherein the substrate is a microfluidic channel.

15. The method for transferring a nanoparticle monolayer according to claim 2, wherein multiple nanoparticle monolayers are transferred at the same time to a same substrate by using multiple capillary tubes.

16. The method for transferring a nanoparticle monolayer according to claim 1, comprising:
    a step of separating and transferring the nanoparticle monolayer to a substrate on which a material to be detected is located by using the capillary tube; and
    a step of detecting the material to be detected on the substrate from a Raman signal of the transferred nanoparticle monolayer.

17. The method for transferring a nanoparticle monolayer according to claim 16, wherein the substrate is clothing surface, food surface, banknote surface, cell surface or porous filter surface.

18. The method for transferring a nanoparticle monolayer according to claim 17, wherein the method is for detecting a drug or an explosive on clothing surface or banknote surface or a harmful material on food surface.

19. The method for transferring a nanoparticle monolayer according to claim 1, comprising:
    separating the nanoparticle monolayer by using h capillary tube and transferring the nanoparticle monolayer in the capillary tube to at least one part of an authentic banknote for prevention of counterfeiting.

20. The method for transferring a nanoparticle monolayer according to claim 1, wherein the nanoparticle monolayer is separated and transferred to a microfluidic channel by using the capillary tube.

* * * * *